US011431390B2

(12) United States Patent
Raghavan et al.

(10) Patent No.: US 11,431,390 B2
(45) Date of Patent: Aug. 30, 2022

(54) HIGHER RANK MULTIPLE INPUT MULTIPLE OUTPUT ENHANCEMENTS IN MILLIMETER WAVE AND SUB-TERAHERTZ BANDS

(71) Applicant: QUALCOMM Incorporated, San Diego, CA (US)

(72) Inventors: Vasanthan Raghavan, West Windsor Township, NJ (US); Junyi Li, Chester, NJ (US); Kapil Gulati, Belle Mead, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/082,529

(22) Filed: Oct. 28, 2020

(65) Prior Publication Data

US 2021/0194551 A1 Jun. 24, 2021

Related U.S. Application Data

(60) Provisional application No. 62/950,732, filed on Dec. 19, 2019.

(51) Int. Cl.
*H04M 1/00* (2006.01)
*H04B 7/0456* (2017.01)
(Continued)

(52) U.S. Cl.
CPC ........... *H04B 7/0486* (2013.01); *H04B 7/028* (2013.01); *H04B 7/0617* (2013.01)

(58) Field of Classification Search
CPC .... H04B 7/0486; H04B 7/028; H04B 7/0617; H04B 7/063; H04B 7/0469; H04B 7/0665
(Continued)

(56) References Cited

U.S. PATENT DOCUMENTS 9,042,276 B1 * 5/2015 Harel ................... H04B 7/0617
370/278
2014/0071912 A1 3/2014 Hou et al.
(Continued)

OTHER PUBLICATIONS

International Search Report and Written Opinion—PCT/US2020/058012—ISA/EPO—dated Apr. 16, 2021.
(Continued)

*Primary Examiner* — Tanmay K Shah
(74) *Attorney, Agent, or Firm* — Holland & Hart LLP

(57) ABSTRACT

Methods, systems, and devices for wireless communications are described for implementation of higher rank transmissions (e.g., higher rank line of sight (LOS) schemes) over a given beam direction associated with a selected transmission configuration indicator (TCI) state. According to some aspects, expanded antenna arrays, spatial separation (e.g., distance) between antenna elements, lower carrier frequencies (e.g., associated with frequency range 4 (FR4) systems), etc. may be leveraged to communicate uncorrelated signals (e.g., independent streams across spatial layers) for higher rank transmissions using a given TCI state (e.g., using a single beam direction). Various aspects of the described techniques may provide for higher rank directional communications by a user equipment (UE) (e.g., via uncorrelation in a single UE), higher rank directional communications by select UEs (e.g., via uncorrelation across specific UEs), base station antenna selection for uncorrelation at multiple served UEs, etc.

30 Claims, 25 Drawing Sheets

(51) Int. Cl.
*H04B 7/02* (2018.01)
*H04B 7/06* (2006.01)

(58) Field of Classification Search
USPC ........................................................ 455/562.1
See application file for complete search history.

(56) References Cited

U.S. PATENT DOCUMENTS

2016/0241322 A1* 8/2016 Son ..................... H04B 7/0695
2017/0134082 A1   5/2017 Onggosanusi et al.
2017/0244451 A1* 8/2017 Raghavan ........... H04W 72/046
2018/0331935 A1   11/2018 Ross et al.

OTHER PUBLICATIONS

Partial International Search Report—PCT/US2020/058012—ISA/EPO—dated Feb. 1, 2021.
Werner K., et al., "Antenna Configurations for 4×4 MIMO in LTE—Field Measurements", 2010 IEEE Vehicular Technology Conference (VTC 2010—Spring)—May 16-19, 2010—Taipei, Taiwan, IEEE, US, May 16, 2010 (May 16, 2010), pp. 1-5, XP031695987, ISBN: 978-1-4244-2518-1, abstract, Sections I-III; pp. 1-2.

* cited by examiner

HIGHER RANK MULTIPLE INPUT MULTIPLE OUTPUT ENHANCEMENTS IN MILLIMETER WAVE AND SUB-TERAHERTZ BANDS

CROSS REFERENCE

The present Application for Patent claims the benefit of U.S. Provisional Patent Application No. 62/950,732 by RAGHAVAN et al., entitled "HIGHER RANK MULTIPLE INPUT MULTIPLE OUTPUT ENHANCEMENTS IN UPPER MILLIMETER WAVE BANDS," filed Dec. 19, 2019, assigned to the assignee hereof, and expressly incorporated by reference herein.

BACKGROUND

The following relates generally to wireless communications, and more specifically to higher rank multiple input multiple output (MIMO) enhancements in millimeter wave (mmW) and sub-Terahertz (sub-THz) bands.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may operate in mmW frequency ranges, e.g., 24 GHz, 26 GHz, 28 GHz, 39 GHz, 57-71 GHz, 95 GHz, 135-155 GHz, etc. Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration, and blockage losses in mmW and beyond communications systems, transmissions from the base station and/or the UE may be beamformed. Moreover, a receiving device may use beamforming techniques to configure antenna(s) and/or antenna array(s) and/or antenna array module(s) such that transmissions are received in a directional manner.

SUMMARY

The described techniques relate to improved methods, systems, devices, and apparatuses that support higher rank multiple input multiple output (MIMO) enhancements in millimeter wave (mmW) and sub-Terahertz (sub-THz) bands. Generally, the described techniques provide for enhanced higher rank MIMO schemes and associated signaling methods for high frequency communications (e.g., for frequency range 4 (FR4) systems, systems operating between 52.6 GHz and 114.25 GHz and beyond such as the sub-THz regime beginning at 275 GHz). For example, the techniques described herein may provide for implementation of higher rank transmissions (e.g., higher rank line of sight (LOS) schemes) over a given beam direction associated with a selected transmission configuration indicator (TCI) state. According to some aspects, larger antenna arrays, spatial separation (e.g., distance) between sets of antenna elements, higher carrier frequencies (e.g., associated with FR4 systems and beyond), etc. may be leveraged to communicate uncorrelated signals (e.g., independent streams across spatial layers) for higher rank transmissions using a given TCI state (e.g., using a single beam direction). Various aspects of the described techniques may provide for higher rank directional communications by a UE (e.g., via uncorrelation in a single UE), higher rank directional communications by select UEs (e.g., via uncorrelation across specific UEs), base station antenna selection for uncorrelation at multiple served UEs, etc.

DETAILED DESCRIPTION

Figure 1:
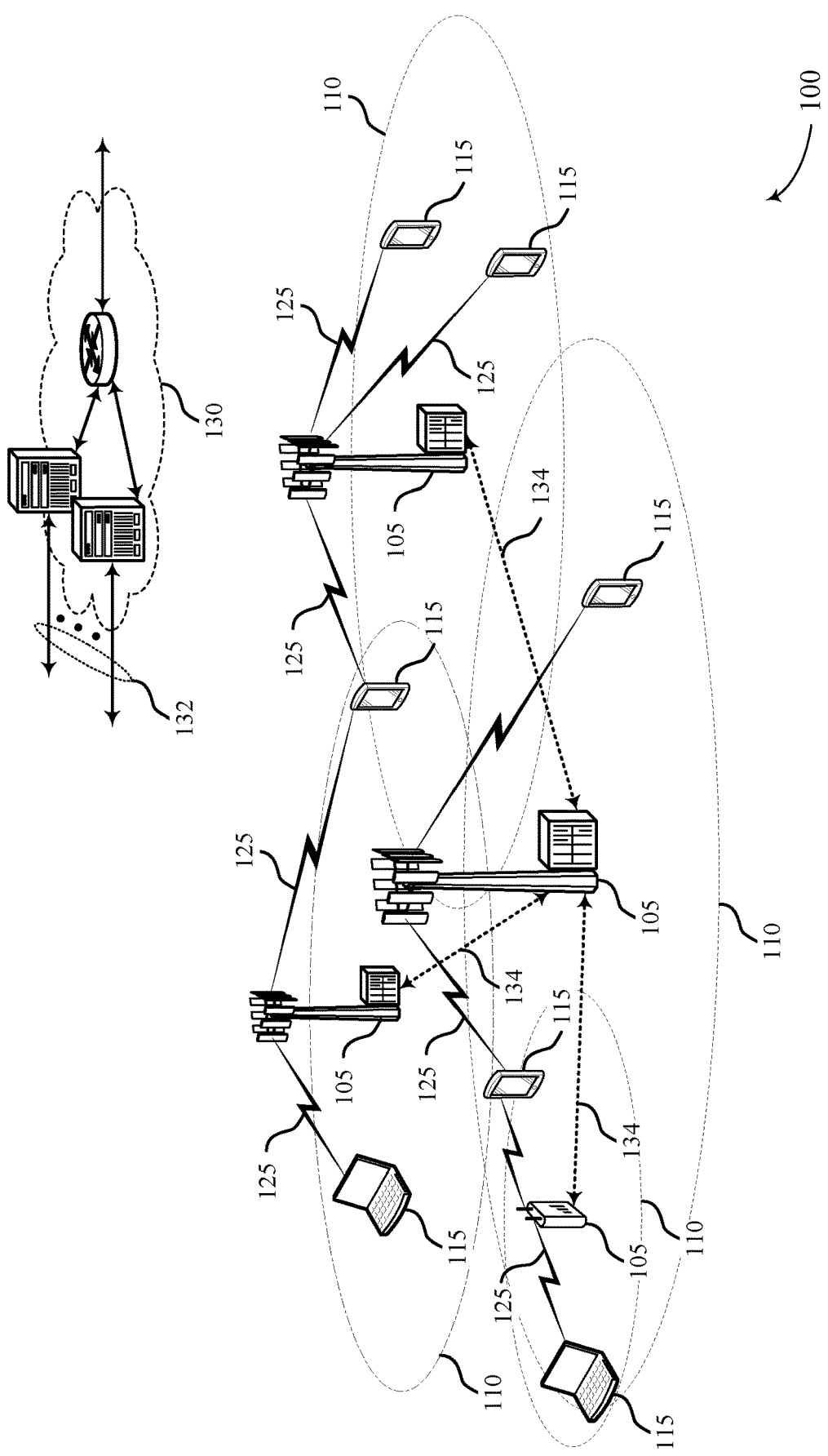
FIG. 1 illustrates an example of a system for wireless communications that supports higher rank multiple input multiple output (MIMO) enhancements in millimeter wave (mmW) and sub-Terahertz (sub-THz) bands in accordance with aspects of the present disclosure.

Some wireless communications systems may operate in millimeter wave (mmW) frequency ranges (e.g., 28 GHz, 39 GHz, or 60 GHz). In some cases, wireless communication at these frequencies may be associated with increased signal attenuation (e.g., path loss), which may be influenced by various factors, such as reflection, diffraction, blockage, etc. As a result, signal processing techniques such as beamforming (in particular, directional transmissions and receptions) may be used to coherently combine signal energy and overcome the path loss in specific beam directions. In some cases, a device may select an active beam for communicating with a network by selecting the strongest beam from amongst a number of candidate beams.

In some examples, a device may operate according to a multiple input multiple output (MIMO) operation mode, such as a polarization MIMO operation mode or a spatial MIMO operation mode. For example, a UE may support some number of radio frequency (RF) chains (e.g., 2 RF chains for transmission (2Tx) or 2 RF chains for reception (2Rx)). In some cases, the RF chains may be utilized in a spatial MIMO operation mode such that two directional beams may be focused in different directions or on different clusters. In other cases, the RF chains may be utilized in a polarization MIMO operation mode such that a single directional beam is used over two orthogonal polarizations for a 2× rate increase. In some examples, line of sight (LOS) links assume rank-1 transmissions (with a single polarization of antenna) or rank-2 (with dual antenna polarization). However, wireless communications systems may be designed to operate in higher frequency regions (e.g., frequency range 4 (FR4) systems or 52.6 GHz to 114.25 GHz), which may allow more degrees of freedom in terms of antenna array arrangement, antenna placement, and dynamic antenna selection (e.g., at a symbol level, slot level, collection of slots level). As such, higher rank transmissions may be possible in LOS links by using uncorrelated antenna elements (e.g., even with a single polarization of antenna elements).

The described techniques provide for enhanced higher rank MIMO schemes and associated signaling methods for high frequency communications (e.g., for FR4 systems, 52.6 GHz to 114.25 GHz, or mmW bands). But these schemes may not be limited to FR4 bands and may be equally applicable at FR2 (24.25 to 52.6 GHz) as well as sub-Terahertz (sub-THz) bands which encompass 275 GHz and beyond. For example, the techniques described herein may provide for implementation of higher rank transmissions (e.g., higher rank LOS schemes) over a given beam direction associated with a selected transmission configuration indicator (TCI) state. According to some aspects, large antenna arrays, spatial separation (e.g., distance) between antenna elements, higher carrier frequencies (e.g., associated with FR4 systems), etc. may be leveraged to communicate uncorrelated signals (e.g., independent streams across spatial layers) using a given TCI state (e.g., for higher rank transmissions using a single beam direction).

Wireless devices (e.g., base stations or user equipment (UEs)) may leverage uncorrelation between transmitting entities (e.g., UE antenna modules or transmit antenna elements of a transmit array) and a receiver (e.g., a receive array). For example, a UE may combine antenna modules (e.g., two antenna modules located at opposite sides/edges of the device) in an uncorrelated manner for communications with a base station (e.g., for improved data rates and performance with higher rank transmissions). The UE may determine a rank (e.g., an analog or directional rank capability) for a TCI state based on a number of antenna modules, spatial separation distances (e.g., Rayleigh distances) between antenna modules, UE position and distance from the base station, etc. The UE may then indicate TCI states, as well as rank for the TCI states, to the base station. In some cases, a UE may indicate availability of antenna modules that can receive/transmit uncorrelated streams to the base station. As such, based on UE feedback, the base station may use higher rank transmissions on indicated TCI states.

According to some examples, two or more UEs may cooperatively combine their antenna arrays (transmit and/or receive antenna arrays) pointing in a same or similar direction for higher rank gains with a base station. For example, a base station, or two UEs, may determine whether the two UEs can receive/transmit uncorrelated streams based on positions or locations of the two UEs relative to the base station and positions or locations of the two UEs relative to each other. In scenarios where two or more UEs are able to receive/transmit uncorrelated streams (e.g., based on their positions relative to the base station, a Rayleigh distance separating the UEs, or a carrier frequency for communications with the base station), the UEs may indicate an identified TCI state and coordinate higher rank transmissions accordingly. For example, the two or more UEs and a base station may coordinate UE antenna module usage (e.g., for UEs to combine higher rank uplink transmissions), channel state information (CSI) acquisition, information decoding (e.g., for UEs to correctly receive higher rank downlink transmissions), etc.

The techniques described herein may further provide for base station antenna selection (e.g., base station antenna array partitioning) for serving multiple UEs in an access network (or multiple base stations in a backhaul network) in an uncorrelated manner. For example, a base station may select some subset of antenna elements to communicate with a receive node (e.g., a UE or base station) based on spatial separation distances between antenna elements of the antenna array (e.g., as well as based on the distance between the base station and the receive node). As such, a base station may partition the antenna array across multiple UEs (e.g., the base station may select different subsets of antenna elements for different receive nodes) to ensure uncorrelation for served receive nodes (e.g., based on Rayleigh distances between selected antenna elements). In some examples, a base station may coordinate with receive nodes (e.g., coordinate which spatial streams correspond to which receive nodes), a base station may test different antenna subset combinations, etc.

The described techniques may provide for efficient utilization of uncorrelated transmitting entities (e.g., uncorrelated UE antenna modules, uncorrelated UEs, or uncorrelated antenna elements) for higher rank MIMO schemes. Such schemes may realize improved wireless communications performance (e.g., such as throughput rate increase or beam robustness across different antenna modules). Further, the described techniques may provide for efficient UE indication (e.g., signaling) of support of various higher rank MIMO schemes, efficient configuration of higher rank MIMO schemes, etc. Aspects of the described techniques may thus provide for efficient implementation of higher rank MIMO schemes, such that increased throughput rates may be achievable while being configured efficiently in terms of capability signaling overhead, coordination signaling overhead, wireless device power consumption, etc.

Aspects of the disclosure are initially described in the context of a wireless communications system. An example uncorrelated signaling diagram, an example antenna array configuration diagram, example process flows, and additional example wireless communications systems illustrating aspects of the described techniques are then discussed. Aspects of the disclosure are further illustrated by and described with reference to apparatus diagrams, system diagrams, and flowcharts that relate to higher rank MIMO enhancements in upper mmW bands.

FIG. 1 illustrates an example of a wireless communications system 100 that supports dynamic switching between different MIMO operation modes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some deployments, base stations 105 may support communications using one or more TRPs to improve reliability, coverage, capacity performance, or combinations thereof. In some cases, UEs 115 may establish beamformed communications links with multiple TRPs to simultaneously receive and transmit communications with the multiple TRPs. For example, a UE 115 may receive a physical downlink control channel (PDCCH), decode control information from the PDCCH and decode a subsequent physical downlink shared channel (PDSCH) transmission using the decoded control information.

Wireless communications system 100 may operate using one or more frequency bands, for example, in the range of 300 Megahertz (MHz) to 300 Gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. The frequencies beyond 275 GHz are generally known as the sub-Terahertz (sub-THz) bands. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. In some cases, mmW or FR2 systems may be associated with deployments in 24 GHz. 26 GHz, 28 GHz, 39 GHz, etc. FR4 systems (e.g., or upper mmW bands) may be associated with 52.6 GHz (and beyond). Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multi-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunications system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Generally, wireless communications system 100 may support MIMO operation mode configuration (e.g., configuration of spatial MIMO, polarization MIMO, or both, across one or more antenna modules of a UE 115) based on the UE characteristics, channel characteristics, or both. For example, a base station 105 and a UE 115 may perform a beam training procedure, and the UE 115 may determine channel characteristics, as well as UE characteristics, for MIMO operation mode configuration. Channel characteristics may include RSRP measurements associated with some set of beam indices, dominant clusters in a channel, blockage conditions at the UE 115, robustness thresholds, etc.

For example, during a beam training procedure, a set of beam indices (e.g., some top K beam indices) may be identified by a UE 115. Based on reference signal received power (RSRP) measurements associated with the set of beam indices, the UE 115 may determine a sense of the number of dominant clusters in the channel that are viable from the perspective of establishing directional links, obtain a sense of the number of blockers in the environment, obtain robustness parameters, etc. UE characteristics may include data rate thresholds, download latency thresholds, upload latency thresholds, beam management overhead thresholds, power consumption thresholds, thermal thresholds, maximum permissible exposure thresholds, etc. (e.g., which may be based on an application running at the UE 115 or thermal and/or power measurements at the UE 115).

Another function may be performed in a mmW network which may include cluster identification. Broadly, a cluster may refer to a property of the wireless channel between the transmitting device (e.g., a base station 105) and the receiving device (e.g., a UE 115). A "cluster" is a standard term in channel modeling and MIMO processing for distinct objects or surfaces (e.g., reflectors such as glass windows/panes, lamp posts, or diffraction objects such as building corners, foliage) within a channel environment that allow propagation from the transmitting device to the receiving device. For example, clusters within the wireless channel may impact the propagation path/characteristics of the beamformed signal in some manner, at least to some degree. For example, glass windows or other flat, reflective surfaces may reflect a beamformed transmission in the direction of the receiving device, which may create a cluster for the wireless channel. Cluster identification is an important function in determining the channel propagation characteristics (e.g., channel characteristics) in a mmW network.

In some aspects, beam management techniques may include a transmitting device (e.g., a base station 105) transmitting multiple beamformed signals in a sectoral or sweeping manner around its coverage area. The receiving device (e.g., a UE 115) may monitor for the beamformed signals and measure signal strengths using one or more receive beams. In some examples, the transmitting device (e.g., the base station 105) may configure the receiving device (e.g., the UE 115) to return channel measurements for a particular number of its beamformed signals. The receiving device identifies the particular number of transmit beams and corresponding receive beams having the strongest signal level and returns those to the transmitting device in a beam measurement report. In some cases, wireless communications systems may use TCI states to indicate spatial parameters (e.g., beam direction) for communicating signals. In some cases, a TCI state may be associated with a synchronization signal block (SSB) and may indicate quasi co-location (QCL) relationships between UE 115 received reference signals and subsequent downlink transmissions (e.g., from a base station 105).

Wireless communications system 100 may support enhanced higher rank MIMO schemes and associated signaling methods for high frequency communications (e.g., for FR4 systems, 52.6+ GHz systems, 110+ GHz systems, or 275+ GHz systems). For example, the techniques described herein may provide for implementation of higher rank transmissions (e.g., higher rank LOS schemes or higher rank non-line of sight (NLOS)/dominant cluster schemes) over a given beam direction associated with a selected TCI state. According to some aspects, large antenna arrays, spatial separation (e.g., distance) between antenna elements, higher carrier frequencies (e.g., associated with FR4 systems), etc. may be leveraged for base station 105 and UEs 115 to communicate uncorrelated signals (e.g., independent streams across spatial layers) for higher rank transmissions using a given TCI state (e.g., using a single beam direction). Various aspects of the described techniques may provide for higher rank directional communications by a UE 115 (e.g., via uncorrelation in a single UE 115), higher rank directional communications by select UEs 115 (e.g., via uncorrelation across specific UEs 115), base station 105 antenna selection for uncorrelation at multiple served UEs 115, etc.

Figure 2A:
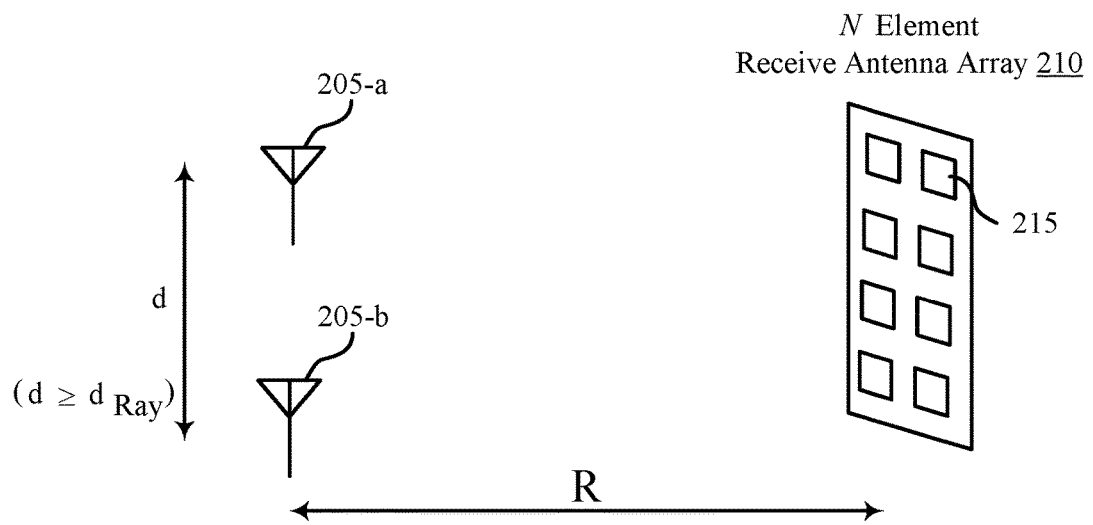
FIG. 2A illustrates an example of an uncorrelated signaling diagram that supports higher rank MIMO enhancements in mmW and sub-THz bands in accordance with aspects of the present disclosure.

FIG. 2A illustrates an example of an uncorrelated signaling diagram 200 that supports higher rank MIMO enhancements in upper mmW bands in accordance with aspects of the present disclosure. In some examples, uncorrelated signaling diagram 200 may implement aspects of wireless communication system 100. Uncorrelated signaling diagram 200 may illustrate conditions for transmission of uncorrelated signals (e.g., such that signals transmitted by transmitting entity 205-a and transmitting entity 205-b appear uncorrelated at a receive antenna array 210).

For example, a Rayleigh distance ($d_{Ray}$) may refer to a minimum separation between two transmitting entities 205 (e.g., transmitting entity 205-a and transmitting entity 205-b) such that the receive antenna array 210 appears to be uncorrelated. In other words, Rayleigh distance ($d_{Ray}$) may be the minimum spatial separation distance between two transmitting entities 205 such that the transmitting entities 205 are seen as distinct and uncorrelated at a receiving device (e.g., at a receive antenna array 210). The Rayleigh distance ($d_{Ray}$) may depend on the distance (R) between the transmitting entities 205 and the receive antenna array 210, the number of antenna elements 215 (N) of the receive antenna array 210, as well as the wavelength (λ) associated with the transmitted signals (e.g., which depends on the carrier frequency ($f_c$) used for communications between the transmitting device and the receiving device). For example, a Rayleigh distance ($d_{Ray}$) may be calculated as:

$$d_{Ray} = \sqrt{\frac{R\lambda}{N}}$$

where λ is the wavelength of propagation, R is the separation between Tx and Rx arrays, and N is the number of antennas at the Rx array. It should be noted that the role of Tx and Rx antennas can be reversed.

As such, in cases where the distance (d) between the transmitting entities 205 is at least the Rayleigh distance ($d_{Ray}$) (e.g., in cases where $d \geq d_{Ray}$), the transmitting entities 205 may transmit signals, over the same beam direction or same TCI state, to a receive antenna array 210 where the signals from each of transmitting entity 205-a and transmitting entity 205-b appear uncorrelated. In other words, a transmitting device (or multiple transmitting devices) may put independent layers at transmitting entities 205 that are uncorrelated (e.g., at transmitting entities 205 separated by $d_{Ray}$), which may provide for higher rank transmissions towards a same direction (e.g., using a same TCI state). Generally aspects of the described techniques may use such conditions (e.g., such that $d \geq d_{Ray}$ for transmitting entities 205 or such that $d + d_{RayThresh} \geq d_{Ray}$ for transmitting entities 205) for establishment, configuration, coordination, etc. of enhanced higher rank MIMO schemes described herein. For example, transmitting entities 205 may refer to or represent antenna modules of a UE 115 (e.g., for higher rank directional uplink transmission by a single UE 115), separate UEs 115 (e.g., for combined higher rank directional uplink transmission by select UEs 115 via uncorrelation across specific UEs 115), antenna elements 215 of a base station transmit antenna array (e.g., for base station antenna selection for higher rank directional downlink transmission to multiple served UEs), etc.

If $d < d_{Ray}$, correlation may increase proportionately, however spectral efficiency gains may still be realized as long as correlation coefficient is small (e.g., or as long as d is greater than a threshold value, $d_{RayThresh}$). As can be seen by the $d_{Ray}$ equation above, as $f_c$ increases, inter-antenna separation (e.g., transmitting entity 205 separation) needed for uncorrelation (Rayleigh distance) decreases and thus can be more easily realized in a given form factor/physical aperture separation. That is, as the carrier frequency increases, the distance between transmitting entities 205 for uncorrelation decreases (e.g., as $f_c$ increases/λ decreases, $d_{Ray}$ decreases), which may provide for more freedom in physical antenna arrays to leverage such uncorrelation. For example:

with $f_c$=6 GHz, N=4, R=100 m, the spatial separation distance $d_{Ray}$=1.1 m
with $f_c$=30 GHz, N=4, R=100 m, the spatial separation distance $d_{Ray}$=0.5 m,
with $f_c$=120 GHz, N=4, R=100 m, the spatial separation distance $d_{Ray}$=0.25 m.

Some wireless communications systems (e.g., wireless communications system 201 or FR4 systems) may be associated with high carrier frequencies (e.g., smaller λ), small cells (e.g., such that R separation between Tx and Rx arrays is also small), and large antenna arrays (e.g., large N), all of which may be leveraged (e.g., for reduced $d_{Ray}$, such that transmitting devices may effectively employ uncorrelated signal transmissions). In other words, $d_{Ray}$ decreases as R decreases, as $f_c$ increases, and as N increases (e.g., all of which may be favorable for small cell, large array, upper mmW and beyond bands—the scope of FR4 and beyond).

Figure 2B:
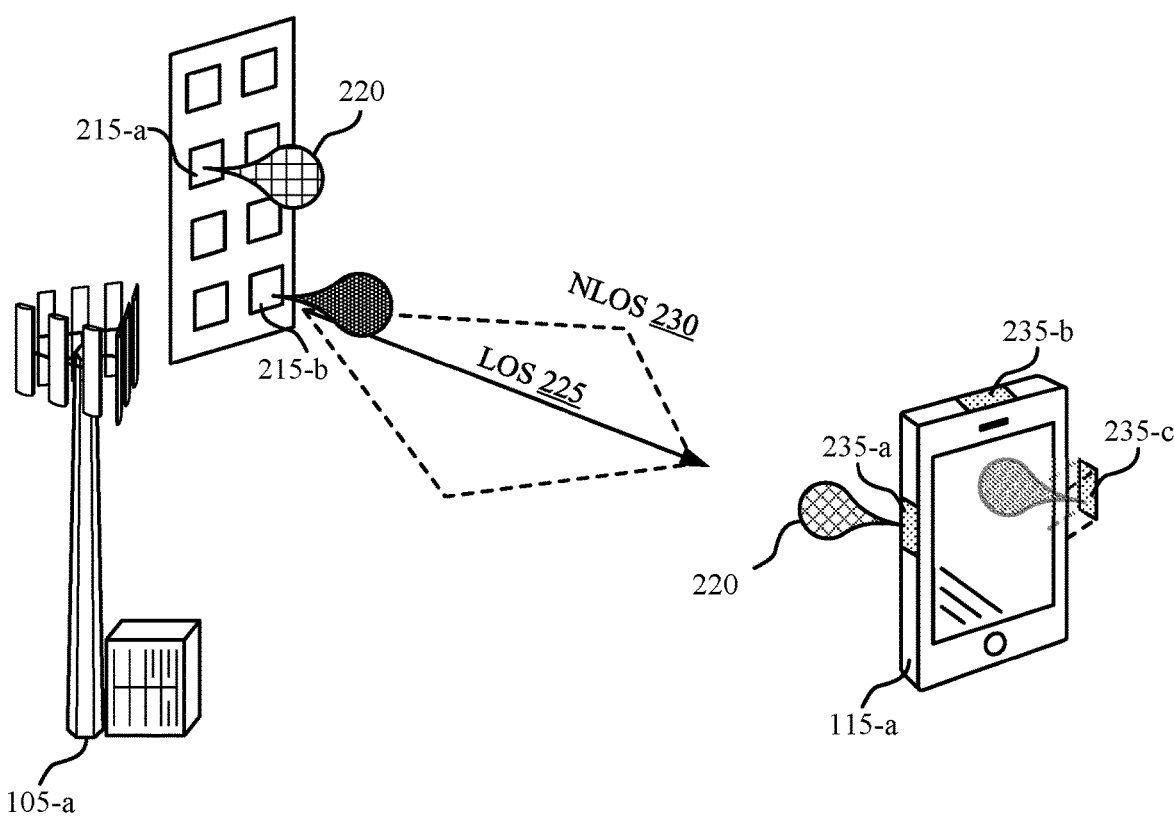
FIG. 2B illustrates an example of a wireless communications system that supports higher rank MIMO enhancements in mmW and sub-THz bands in accordance with aspects of the present disclosure.

FIG. 2B illustrates an example of a wireless communications system 201 that supports higher rank MIMO enhancements in upper mmW bands in accordance with aspects of the present disclosure. In some examples, wireless communications system 201 may implement aspects of wireless communications system 100 and/or uncorrelated signaling diagram 200. For example, aspects of wireless communications system 201 may be implemented by a base station 105-a and a UE 115-a, which may be examples of a base station 105 and a UE 115, as described herein.

Generally, a transmitting device (e.g., a base station 105-a for downlink transmission or a UE 115-a for uplink transmissions) and the receiving device (e.g., a base station 105-a for uplink transmission or a UE 115-a for downlink transmissions) may be configured to perform wireless communications in a mmW network. For example, a transmitting device may have a transmitter array that includes a set of antenna elements 215 that are used by the transmitting device to configure a beamformed signal for wireless transmission to a receiving device. Similarly, a receiving device may have a receiver array that includes a set of antenna elements 215 that are used by the receiving device to receive a signal from a transmitting device in a directional manner. In some cases, a transmitter array may also be used for beamformed reception and the receiver array may be used for transmitting beamformed signals (e.g., a transmitter array and a receiver array may be a same array of antenna elements, or may be different arrays of antenna elements). For example, a transmitting device and a receiving device may utilize digital and/or analog techniques to control one or more of the antenna elements in order to perform wireless communications using beamformed signals. Generally, a transmitting device and/or receiving device may utilize such beamforming techniques in a mmW network for access traffic and/or backhaul traffic (e.g., such as an integrated access and backhaul (IAB) network).

As discussed, FR4 and beyond may allow more "degrees of freedom" in terms of antenna array arrangement, placement and dynamic selection (at a symbol/slot/collection of slots level). A good use-case for FR4 may be for LOS links 225 in backhaul, data centers, etc. In some examples, LOS links 225 may assume rank-1 transmissions (with a single polarization of antenna) or rank-2 transmissions (with dual antenna polarization). However, the techniques described herein may provide for higher rank transmissions in LOS links 225 by using uncorrelated antenna elements 215 (e.g., even with a single polarization of antenna elements). The techniques described herein provide for enhanced/higher rank LOS schemes and associated signaling methods for FR4 (higher rank transmissions along any NLOS link 230, or along any dominant cluster, may also be possible).

As discussed, wavelength ($\lambda$) decreases as $f_c$ increases. In this scenario, more antenna elements 215 may be packed together (e.g., in an antenna array) for transmissions at such higher frequencies. For example, some mmW wireless communications systems may include wireless devices with 4 antennas. Wireless communications systems operating at even higher frequencies, such as 120 GHz, may include wireless devices with, for example, 16 antennas or 32 antennas. For instance, a cluster may refer to a reflection or diffraction object (e.g., something that propagates energy from a transmitter to a receiver). At lower frequencies, it may be difficult for wireless devices to parse clusters (e.g., due to wider beams associated with such lower frequencies). As such, rank information, channel state feedback (CSF), etc. may be directionless. However, at higher frequencies, beamforming techniques may become more directional (e.g., beams may be narrower due to more antennas and reduced beamwidths). As antenna arrays become large (e.g., as antenna arrays are designed with more antenna elements 215), some antenna elements 215 (or more antenna elements 215) may be separated by a spatial separation distance (e.g., d) greater than or equal to the Rayleigh distance ($d_{Ray}$) for transmission of uncorrelated signals 220. The techniques described herein may be implemented for higher rank (e.g., more spatial layers) along a same direction, such as over LOS link 225, over a dominant cluster such as NLOS link 230, etc. (e.g., as wireless communications systems use higher carrier frequencies, $f_c$).

As discussed herein (e.g., with reference to uncorrelated signaling diagram 200 of FIG. 2A), as long as transmitting entities 205 are separated by some distance (e.g., such as the Rayleigh distance, $d_{Ray}$), a receiving device may see (e.g., receive) uncorrelated signals 220 (e.g., independent layers) from the transmitting entities 205. Wireless communications system 201 may support such higher rank transmissions along a same direction (e.g., using a same TCI state), where a transmitting device may point beams in a same direction with independent streams across spatial layers (e.g., uncorrelated signals 220).

For example, in some cases (e.g., for downlink communications), transmitting entity 205-a may represent an antenna element 215-a of base station 105-a and transmitting entity 205-b may represent an antenna element 215-b of base station 105-a. Antenna element 215-a may be separated from antenna element 215-b by a spatial separation distance d that is greater than or equal to $d_{Ray}$ (e.g., $d \geq d_{Ray}$). As such, antenna element 215-a and antenna element 215-b may transmit uncorrelated signals 220 to UE 115-a (e.g., antenna element 215-a may transmit a first signal 220 and antenna element 215-b may transmit a second signal 220, where the first signal 220 and the second signal 220 may appear uncorrelated at UE 115-a). In other words, UE 115-a may separate out two uncorrelated signals 220 transmitted by base station 105-a (e.g., via antenna element 215-a and antenna element 215-b of base station 105-a), for higher rank (e.g., rank-2) downlink transmission in a same direction (e.g., for higher rank downlink transmission using a same TCI state, for higher rank downlink transmission over a same LOS link 225 or over a same NLOS link 230). In some cases, base station 105-a may configure a transmit antenna array, select antenna elements 215, etc. based on determined spatial separation distances (e.g., d values) associated with antenna elements 215 (e.g., transmitting entities 205).

In some examples (e.g., for uplink communications), transmitting entity 205-a may represent an antenna module 235-a of UE 115-a and transmitting entity 205-b may represent an antenna module 235-c of UE 115-a. Antenna module 235-a may be separated from antenna module 235-c by a spatial separation distance d that is greater than or equal to $d_{Ray}$ (e.g., $d \geq d_{Ray}$). As such, antenna module 235-a and antenna module 235-c may transmit uncorrelated signals 220 to base station 105-a (e.g., antenna module 235-a may transmit a first signal 220 and antenna module 235-c may transmit a second signal 220, where the first signal 220 and the second signal 220 may appear uncorrelated at base station 105-a). In other words, base station 105-a may separate out two uncorrelated signals 220 transmitted by UE 115-a (e.g., via antenna module 235-a and antenna module 235-c of UE 115-a), for higher rank (e.g., rank-2) uplink transmission in a same direction (e.g., for higher rank uplink transmission using a same TCI state, for higher rank uplink transmission over a same LOS link 225 or over a same NLOS link 230). In some cases, UE 115-a may configure a transmit antenna array, select antenna modules 235, etc. based on determined spatial separation distances (e.g., d values) associated with antenna modules 235 (e.g., transmitting entities 205).

For instance, in some cases, UE 115-a may be an example of multi-radio frequency front end (RFFE) UE 115. In the present example, UE 115-a may include three antenna modules (e.g., antenna module 235-a, antenna module 235-b, and antenna module 235-c), and the antenna modules may be located on three edges of the UE 115-a. Each antenna module 235 may be controlled by a radio frequency integrated circuit (RFIC), and RF chains may be switched across different RFICs. In some cases, each antenna module 235 may be equipped with antennas across different bands (e.g., and may share RF chains across bands, such as 28, 39, 42, 73, 95+). UEs 115 (e.g., such as UE 115-a) may be equipped with multiple antenna modules 235 placed at different locations of the UE 115 (e.g., such as shown in UE 115-a) for reasons such as good spherical coverage, antenna module level diversity, overcoming limited reception capabilities, etc. In the example of UE 115-a, antenna module 235-a and antenna module 235-c may be separated by $d_{Ray}$ (e.g., or more) at mmW frequencies. Antenna modules 235 (e.g., antenna module 235-a and antenna module 235-c) may capture rays/clusters in similar directions (e.g., due to their orientation). As such, antenna module 235-a and antenna module 235-c may be combined in an uncorrelated manner to get better rates/performance with higher rank transmissions.

A receiving device (e.g., UE 115-a) may identify transmit beams and corresponding receive beams having strong signal level, and may return or feedback information to the transmitting device (e.g., in a beam measurement report). For example, UE 115-a may identify some beam directions, TCI states, LOS paths 225, NLOS paths 230, etc. (e.g., based on beam selection procedures). According to some aspects of the described techniques, a receiving device may further determine a rank associated with the beam direction (e.g., based on various criteria described herein, with reference to, for example, uncorrelated signaling diagram 200). For example, UE 115-c may determine position and distance (e.g., R) from base station 105-a, determine Rayleigh distance (e.g., $d_{Ray}$), and may indicate availability of antenna modules 235 to base station 105-a that can Rx/Tx uncorrelated streams or uncorrelated signals 220. For example, UE 115-c may indicate availability of some antenna modules 235 (e.g., such as antenna module 235-a and antenna module 235-c, which may be associated with a spatial separation distance d≥$d_{Ray}$). In some cases, the UE 115-c may indicate identification information associated with some antenna modules.

In some cases, UE 115-a may select a TCI state, and indicate a determined rank associated with the TCI state (e.g., UE 115-a feedback may include an indication of a TCI state (or beam direction) as well as a rank associated with the TCI state (or rank associated with the beam direction)). For example, UE 115-a may indicate (e.g., via feedback or beam report) some TCI state A, as well as an indication of supported rank for TCI state A. In some cases, the UE 115-a may indicate which TCI states (e.g., at base station 105-a) support higher rank transmissions. Based on UE 115-a feedback, base station 105-a may use higher rank transmissions on indicated TCI state.

According to the described techniques, wireless communications system 201 may support higher rank for a given beam direction and given antenna polarization. For example, some systems may support indication of higher rank transmissions using higher values for a "Rank Indicator (RI)" in CSF. However, such a RI may be a measure of digital precoding rank (e.g., RI may be a measure of digital precoding at baseband). Further, the RI may be matched to an appropriate precoder matrix from a codebook for codebook based beamforming or an appropriate precoder matrix may be derived for use at base station 105-a for non-codebook based beamforming. The techniques described herein, however, provide for higher rank transmissions along some direction, LOS path, or dominant cluster for NLOS path. In some examples, such a beam direction is used with rank-1 transmissions in non-polarization-based transmissions or rank-2 transmissions in polarization-based transmissions (the described techniques provide for higher rank transmissions on such a chosen direction).

Further, RI in this case corresponds to the use of RF/analog precoding which is phase shifter/automatic gain control (AGC) combining of antennas over the air. RI could also be used in the context of hybrid precoding which is a mix of analog and digital precoding. In some examples, the RI for analog precoding may be assumed to be 1. The described techniques ask for higher rank transmissions on RF precoding (e.g., the described techniques provide for higher rank analog precoding at RF carrier frequency for transmission). For example, a UE 115-a may select or identify a beam direction or TCI state, and the UE 115-a may transmit an indication of the beam direction or TCI state as well as a rank (e.g., an analog rank indication or a rank indication of analog precoding) for the beam direction or TCI state.

Figure 3:
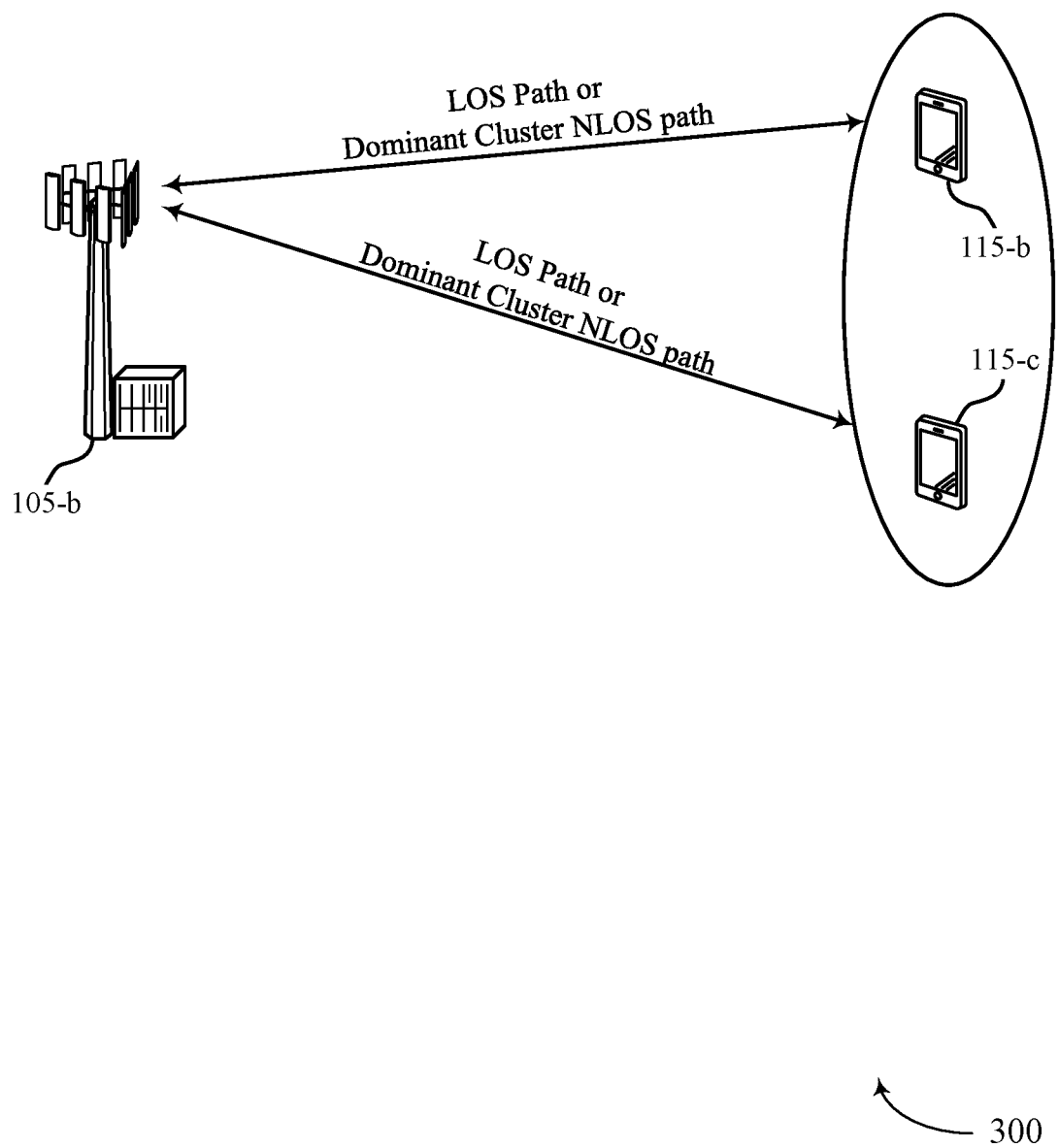
FIG. 3 illustrates an example of a wireless communications system that supports higher rank MIMO enhancements in mmW and sub-THz bands in accordance with aspects of the present disclosure.

FIG. 3 illustrates an example of a wireless communications system 300 that supports higher rank MIMO enhancements in upper mmW bands in accordance with aspects of the present disclosure. In some examples, wireless communications system 300 may implement aspects of wireless communication system 100, uncorrelated signaling diagram 200, and/or wireless communications system 201. For example, aspects of wireless communications system 300 may be implemented by a base station 105-b, a UE 115-b, and a UE 115-c, which may be examples of a base station 105 and UEs 115, as described herein.

As discussed herein (e.g., with reference to uncorrelated signaling diagram 200 of FIG. 2A), as long as transmitting entities 205 are separated by some distance (e.g., such as the Rayleigh distance, $d_{Ray}$), a receiving device may see (e.g., receive) uncorrelated signals (e.g., independent layers) from the transmitting entities 205. Wireless communications system 300 may support such higher rank transmissions along a same direction (e.g., using a same TCI state, LOS path, or dominant cluster NLOS path), where a transmitting device may point beams in a same direction with independent streams across spatial layers (e.g., uncorrelated signals).

In some examples (e.g., for uplink communications), transmitting entity 205-a may represent UE 115-b and transmitting entity 205-b may represent UE 115-c. UE 115-b may be separated from UE 115-c by a spatial separation distance d that is greater than or equal to $d_{Ray}$ (e.g., d≥$d_{Ray}$). As such, UE 115-b and UE 115-c (e.g., when combined, when coordinated, or when transmitting together) may transmit uncorrelated signals to base station 105-b (e.g., UE 115-b may transmit a first signal and UE 115-c may transmit a second signal, where the first signal and the second signal may appear uncorrelated at base station 105-b). In other words, base station 105-b may separate out two uncorrelated signals transmitted by UE 115-b and UE 115-c for higher rank (e.g., rank-2) uplink transmission in a same direction (e.g., for higher rank uplink transmission using a same TCI state, for higher rank uplink transmission over a same LOS path or over a same dominant cluster NLOS path).

In some cases, UE 115-b and UE 115-c may configure or coordinate their respective transmit antenna arrays, UE 115-b and UE 115-c may select or coordinate their respective antenna modules, etc. based on a determined spatial separation distance (e.g., d value) between the UE 115-b and UE 115-c (e.g., between the transmitting entities 205). For example, in some cases, UE 115-b and/or UE 115-c may transmit an indication of a beam direction and a rank associated with the beam direction, where the rank may indicate a combined capability of the UE 115-b and UE 115-c to transmit uncorrelated signals to the base station 105-b over the beam direction.

In some cases (e.g., for downlink communications), transmitting entity 205-a may represent a first antenna element of base station 105-*b* and transmitting entity 205-*b* may represent a second antenna element of base station 105-*b*. The first and second antenna element may be separated by a spatial separation distance d that is greater than or equal to $d_{Ray}$ (e.g., $d \geq d_{Ray}$). As such, base station 105-*b* may (e.g., via the first and second antenna element) transmit uncorrelated signals to UE 115-*b* and UE 115-*c* (e.g., the first antenna element may transmit a first signal to UE 115-*b* and the second antenna element may transmit a second signal to UE 115-*c*, where the first signal and the second signal may appear uncorrelated at UE 115-*b* and UE 115-*c*). In other words, UE 115-*b* and UE 115-*c* may separate out two uncorrelated signals transmitted by base station 105-*b*, for higher rank (e.g., rank-2) downlink transmission in a same direction (e.g., for higher rank downlink transmission using a same TCI state, for higher rank downlink transmission over a same LOS path or over a same dominant cluster NLOS path). In some cases, base station 105-*b* may configure a transmit antenna array, select antenna elements, etc. based on determined spatial separation distances (e.g., d values) associated with antenna elements (e.g., transmitting entities 205). In some examples, UE 115-*b* and/or UE 115-*c* may transmit an indication of a beam direction and a rank associated with the beam direction, where the rank may indicate a combined capability of the UE 115-*b* and UE 115-*c* to receive uncorrelated signals from the base station 105-*b* over the beam direction.

That is, wireless communications system 300 may illustrate aspects of leveraging uncorrelation across specific UEs 115 (e.g., UE 115-*b* and UE 115-*c*). Distributed MIMO across multiple UEs 115 (e.g., UE 115-*b* and UE 115-*c*) associated with LOS/dominant cluster paths with base station 105-*b*. UE 115-*b* and UE 115-*c* may combine their antenna arrays pointing in same/similar directions to get higher-rank gains with the base station 105-*b*. In some cases, there may be coordination across UE 115-*b*, UE 115-*c*, and base station 105-*b* in terms of coordinated antenna module usage, CSI acquisition, information decoding, etc.

In some cases, base station 105-*b* may determine relative positions of UE 115-*b* and UE 115-*c*, and may estimate whether UE 115-*b* and UE 115-*c* can Rx/Tx uncorrelated streams corresponding to Rayleigh distance. In some cases, UE 115-*b* and UE 115-*c* may communicate (e.g., via device-to-device communication or sidelink communication) to determine the spatial separation distance, d, between each other, and UE 115-*b* and/or UE 115-*c* may estimate whether UE 115-*b* and UE 115-*c* can Rx/Tx uncorrelated streams corresponding to Rayleigh distance. For example, UE 115-*b* may receive positioning information from UE 115-*c* via a device-to-device wireless link, where the spatial separation distance, d, between the UE 115-*b* and the UE 115-*c* may be determined based on the received positioning information.

In some cases, base station 105-*b* may determine the spatial separation distance, d, between UE 115-*b* and UE 115-*c*, and the base station 105-*b* may transmit an indication of d to UE 115-*b* and/or UE 115-*c* (e.g., such that UE 115-*b* and/or UE 115-*c* may receive an indication of d and determine rank for a beam direction accordingly). For example, UE 115-*b* may transmit a first positioning signal to base station 105-*b* and UE 115-*c* may transmit a second positioning signal to base station 105-*b*. Base station 105-*b* may determine the spatial separation distance, d, between UE 115-*b* and UE 115-*c* based on the first and second positioning signals (e.g., and base station 105-*b* may transmit an indication of the spatial separation distance, d, to UE 115-*b* and/or UE 115-*c*. In other cases, UE 115-*b* may transmit positioning information of the UE 115-*b* to base station 105-*b*, and UE 115-*c* may receive an indication of the positioning information of the UE 115-*b* such that UE 115-*c* may determine the spatial separation distance, d (e.g., based on UE 115-*c* position relative to base station 105-*b* and the positioning information of the UE 115-*b* receive from base station 105-*b*).

In some cases, UE 115-*b* and UE 115-*c* may coordinate antenna module usage, beam direction, TCI state, timing information, etc. amongst each other (e.g., for transmission or reception of higher rank transmission described herein). UE 115-*b* and UE 115-*c* may indicate availability of coordinated antenna modules for Rx/Tx of uncorrelated streams, as well as an indication of a TCI state (e.g., a selected or requested TCI state). Base station 105-*b* may use higher rank transmissions on the indicated TCI state. In some cases, base station 105-*b* may transmit an indication of which signals are intended for which UE 115 (e.g., such that UE 115-*b* and UE 115-*c* may appropriately receive and decode uncorrelated signals as intended).

Figure 4:
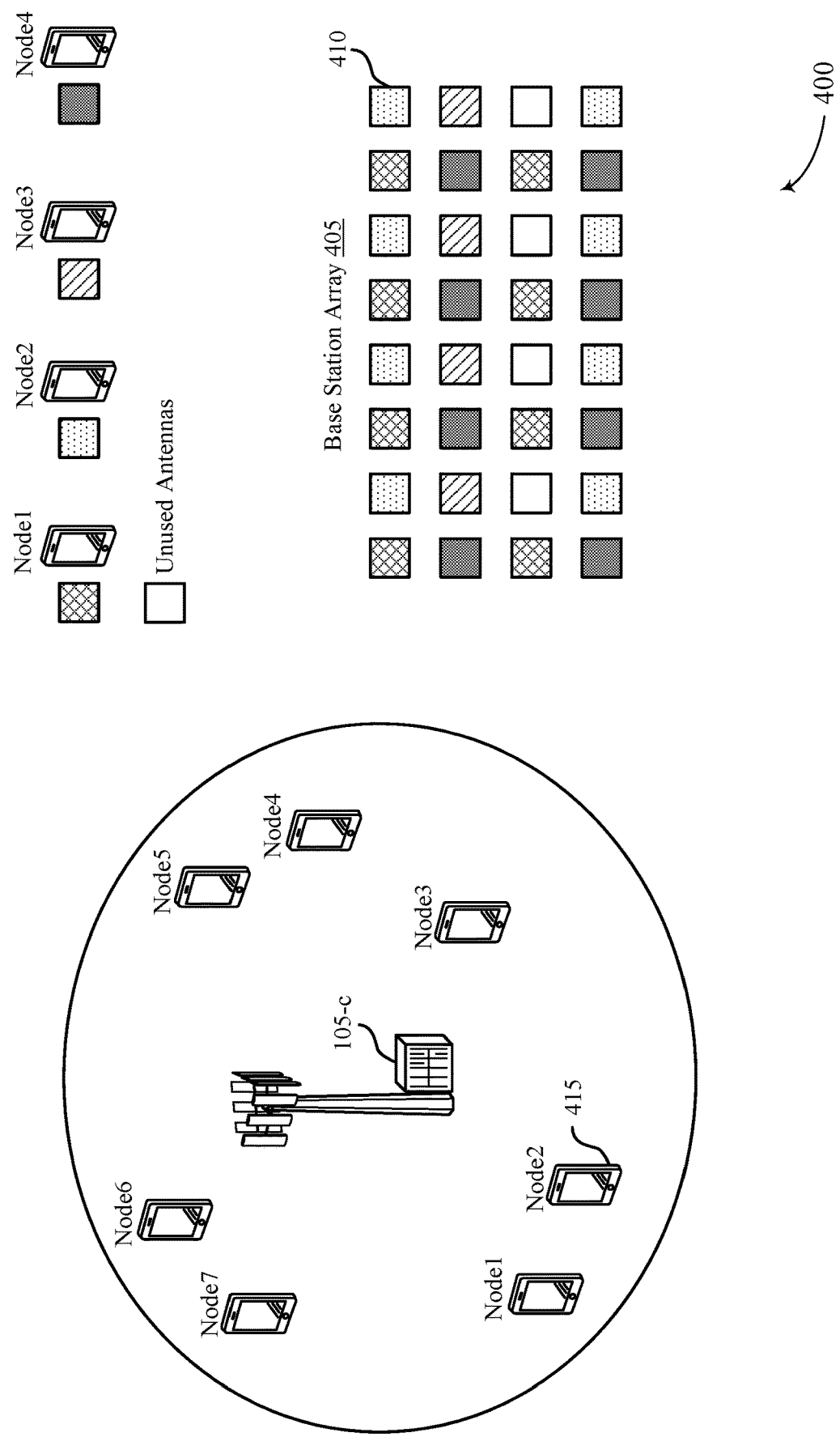
FIG. 4 illustrates an example of an antenna array configuration diagram that supports higher rank MIMO enhancements in mmW and sub-THz bands in accordance with aspects of the present disclosure.

FIG. 4 illustrates an example of an antenna array configuration diagram 400 that supports higher rank MIMO enhancements in upper mmW bands in accordance with aspects of the present disclosure. In some examples, antenna array configuration diagram 400 may implement aspects of wireless communications system 100, uncorrelated signaling diagram 200, wireless communications system 201, and/or wireless communications system 300. For example, aspects of antenna array configuration diagram 400 may be implemented by a base station 105-*c* and UEs 115 which may be examples of a base station 105 and UEs 115, as described herein.

A base station (e.g., base station 105-*c*) may serve multiple UEs 115 in an access network or multiple base stations 105 in a backhaul network. Nodes 415 (e.g., 'Node1,' 'Node2,' 'Node3,' 'Node4,' 'Node5,' 'Node6,' and 'Node7,') may represent or refer to any receiving device or receive node (e.g., such as a UE 115 in an access network or a base station 105 in a backhaul network). Tx-Rx distance may be different for different nodes 415. Base station 105-*c* may select some subset of antennas from the set of all antennas (e.g., base station 105-*c* may select some subset of antenna elements 410 of base station antenna array 405) to communicate with some receive node 415 (e.g., which may be a UE 115/base station 105) based on Rayleigh distance (e.g., spatial separation distance between antenna elements 410). Selection of antenna elements 410 (e.g., configuration of base station antenna array 405, partitioning of base station antenna array 405, or antenna grouping) may involve coordination with one or more receive nodes 415, testing of different antenna subset combinations (e.g., testing of different antenna element 410 groupings), etc.

Example antenna array configuration diagram 400 may illustrate how an 8×4 base station antenna array 405 may be partitioned across multiple receive nodes 415 (e.g., across Node1, Node2, Node3, and Node4) to ensure Rayleigh distance separation (and hence uncorrelation) for the served nodes 415. Example antenna array configuration diagram 400 may assume some antenna elements 410 are unused (e.g., which may or may not be the case in deployment). For example, base station 105-*c* may determine how to partition nodes 415 (e.g., how to configure or partition antenna elements 410 of antenna array 405) based on the relative positions of nodes 415, based on antenna array 405 gain, based on how many antenna elements 410 will be used for a particular node 415, based on how many parallel streams will be used, etc. In some cases, the antenna array 405 may be configured based on receiving TCI state and rank indication information from various nodes 415 (e.g., based on which nodes 415 support higher rank transmissions).

For example, base station 105-*c* may receive a first indication of a first beam direction and a first rank associated with the first beam direction from Node1, as well as a second indication of a second beam direction and a second rank associated with the second beam direction from Node2. Base station 105-*c* may select a first subset of antennas from antenna array 405 for Node1 based on the first indication, and select a second subset of antennas from the antenna array 405 for Node 2 based on the second indication. The first subset of antennas may be selected based on spatial separation distances (d values) between antenna elements 410 of the first subset of antennas as well as a first distance R between the base station 105-*c* and Node1. The second subset of antennas may be selected based on spatial separation distances (d values) between antenna elements 410 of the second subset of antennas as well as a second distance R between the base station 105-*c* and Node2.

Figure 5:
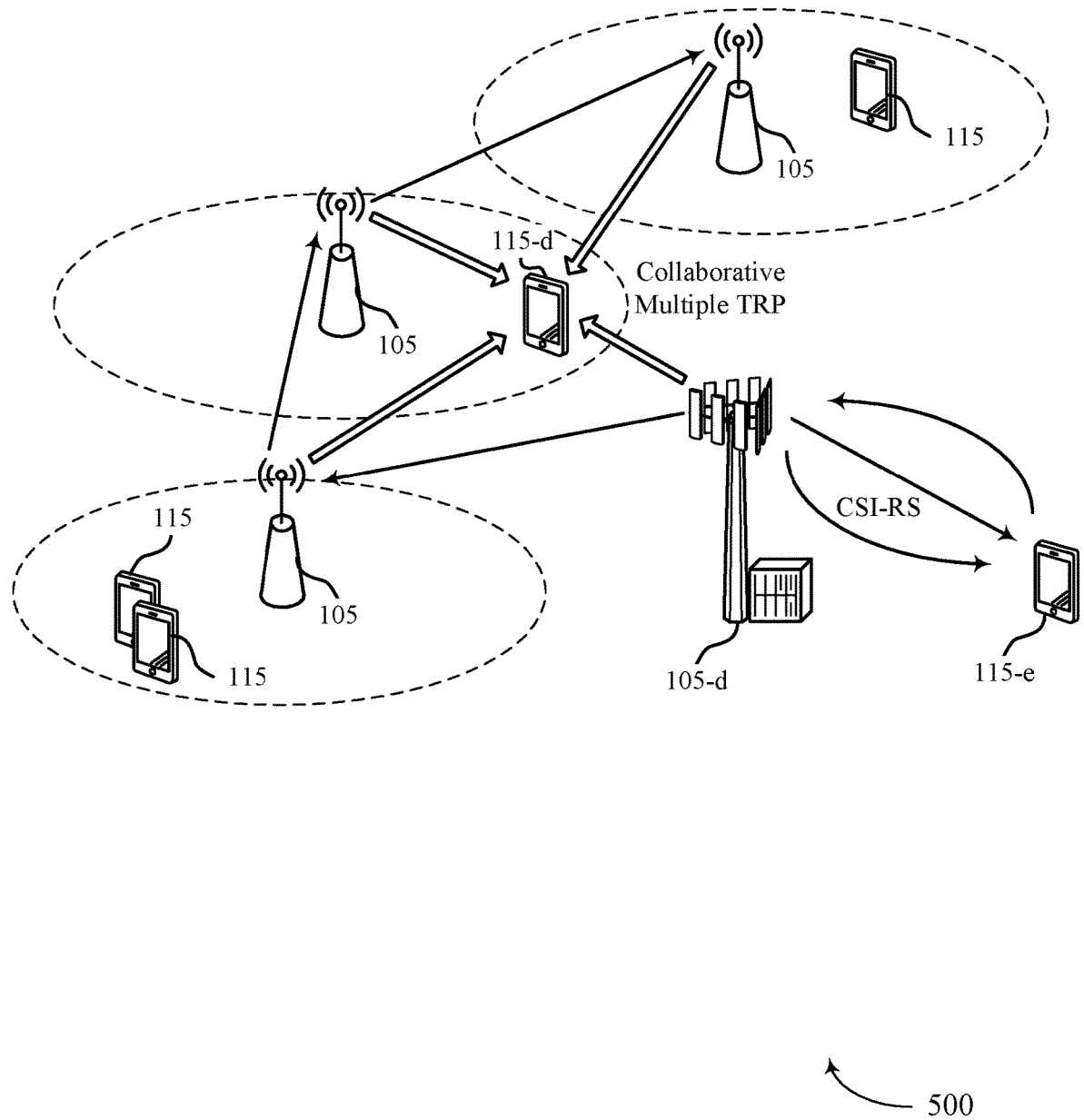
FIG. 5 illustrates an example of a wireless communications system that supports higher rank MIMO enhancements in mmW and sub-THz bands in accordance with aspects of the present disclosure.

FIG. 5 illustrates an example of a wireless communications system 500 that supports higher rank MIMO enhancements in upper mmW bands in accordance with aspects of the present disclosure. In some examples, wireless communications system 500 may implement aspects of wireless communications system 100, uncorrelated signaling diagram 200, wireless communications system 201, wireless communications system 300, and/or antenna array configuration diagram 400. For example, aspects of wireless communications system 500 may be implemented by a base station 105-*d*, UE 115-*d*, and a UE 115-*e*, which may be examples of base stations 105 and UEs 115, as described herein.

As discussed herein, a base station (e.g., base station 105-*d*) may communicate with UEs 115 (e.g., UE 115-*d*) through a number of other access network transmission entities, which may be referred to as a radio head, a smart radio head, or a transmission/reception point (TRP). In some configurations, various functions of each access network entity or base station 105 may be distributed across various network devices (e.g., TRPs 105) or consolidated into a single network device (e.g., a base station 105). Base station 105-*d* may support communications using one or more TRPs 105 to improve reliability, coverage, capacity performance, or combinations thereof. In some cases, UE 115-*d* may establish beamformed communications links with multiple TRPs 105 to simultaneously receive and transmit communications with the multiple TRPs 105. For example, UE 115-*d* may receive PDCCH, decode control information from the PDCCH and decode subsequent PDSCH transmission using the decoded control information.

Wireless communications system 500 may implement various aspect of the techniques described herein. Wireless communications system 500 may illustrate multiple well-separated TRPs 105 coordinating higher rank LOS/NLOS transmissions to a single massive MIMO relay/UE 115-*d* for high data rates. Wireless communications system 500 may illustrate collaborative multiple TRPs 105. In some aspects, wireless communications system 500 may illustrate high quadrature amplitude modulation (QAM) (e.g., SuperQAM) link (e.g., between base station 105-*d* and UE 115-*e*), which may, for example, provide for up to 16384QAM 16 layers.

Figure 6:
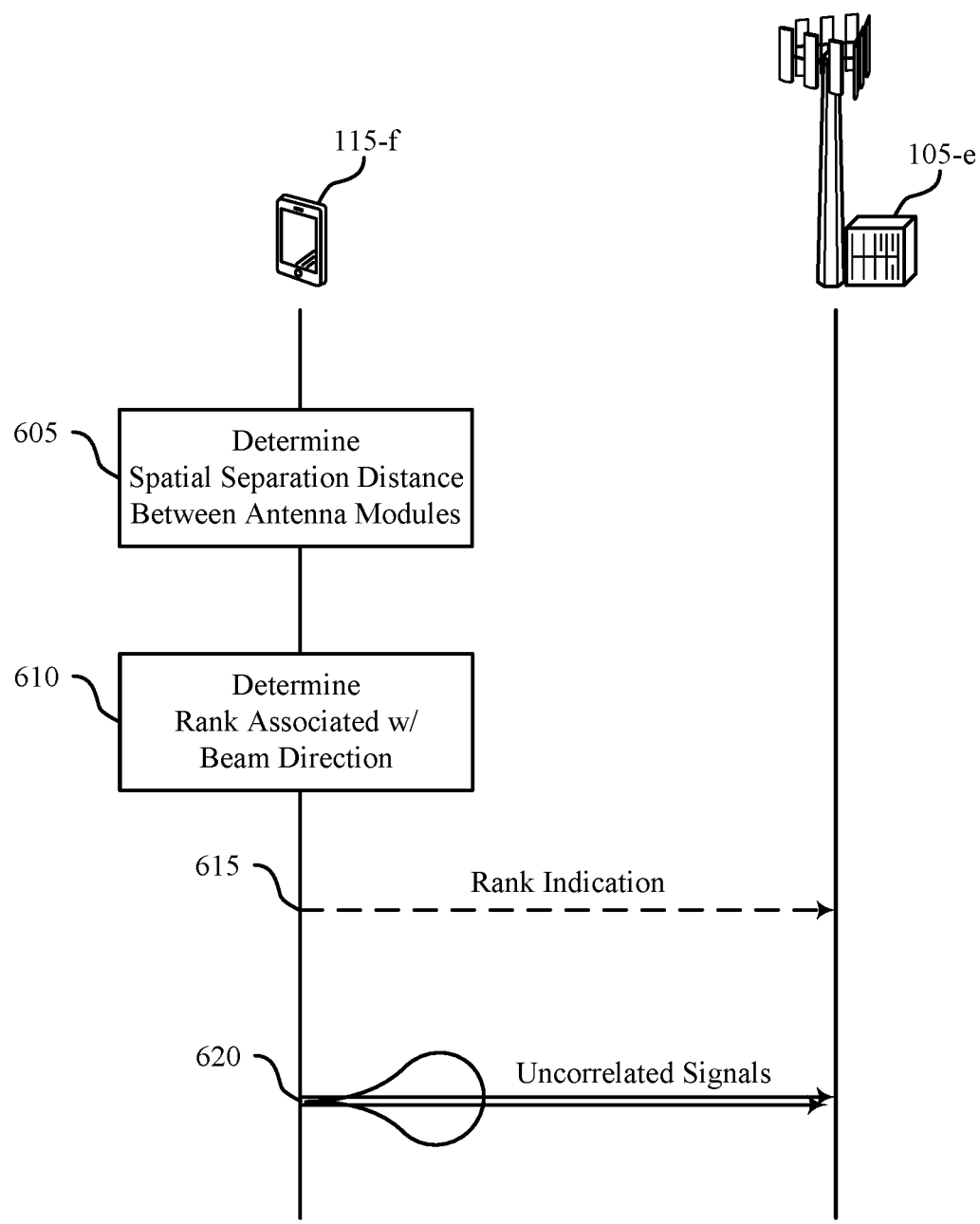
FIG. 6 illustrates an example of a process flow that supports higher rank MIMO enhancements in mmW and sub-THz bands in accordance with aspects of the present disclosure.

FIG. 6 illustrates an example of a process flow 600 that supports higher rank MIMO enhancements in upper mmW bands in accordance with aspects of the present disclosure. In some examples, process flow 600 may implement aspects of wireless communication system 100. Further, process flow 600 may be implemented by a UE 115-*f* and a base station 105-*e*, which may be examples of a UE 115 and a base station 105 described with reference to FIGS. 1-5. In the following description of the process flow 600, the operations between UE 115-*f* and base station 105-*e* may be transmitted in a different order than the order shown, or the operations performed by base station 105-*e* and UE 115-*f* may be performed in different orders or at different times. Some operations may also be left out of the process flow 600, or other operations may be added to the process flow 600. It is to be understood that while base station 105-*e* and UE 115-*f* are shown performing a number of the operations of process flow 600, any wireless device may perform the operations shown.

At 605, UE 115-*f* may determine a spatial separation distance (e.g., d) between at least two transmitting entities or at least two receiving entities. For example, UE 115-*f* may determine a spatial separation distance between two antenna modules of UE 115-*f*.

At 610, UE 115-*f* may determine a rank associated with a beam direction based on the spatial separation distance (e.g., based on the spatial separation distance between two antenna modules of the UE 115-*f*). In some cases, the rank may be determined based on a Rayleigh distance ($d_{Ray}$) and the spatial separation distance (d). For example, UE 115-*f* may calculate or estimate a Rayleigh distance ($d_{Ray}$) based on the distance (R) between the UE 115-*f* and the base station 105-*e*, the number of antenna elements (N) of the base station 105-*e*, as well as the wavelength (λ) of communications or transmissions between UE 115-*f* and base station 105-*e* (e.g., which may depend on the carrier frequency ($f_c$) used for communications between the UE 115-*f* and the base station 105-*e*).

In some cases, UE 115-*f* may determine an orientation of each of the at least two antenna modules, and the rank may be determined based at least in part on the orientations. For example, UE 115-*f* may determine a number of independent layers that can be processed with analog precoding for transmitting or receiving uncorrelated signals over the beam direction based on the spatial separation between the at least two antenna modules, the orientation of each of the at least two antenna modules (e.g., the parallel orientation of two antenna modules), or both.

In some cases, UE 115-*f* may identify one or more beam directions, one or more transmit beams and corresponding receive beams, one or more TCI states, etc. (e.g., based on received signal measurements, or channel conditions), and the rank may be determined accordingly. For example, in some cases, the rank may be different for different beam directions (e.g., based on the orientation of antenna modules or the specific beam direction).

In some cases, the number of antenna elements (N) of the base station 105-*e* may be known by the UE 115-*f* (e.g., such that UE 115-*f* may have the information for determining Rayleigh distance ($d_{Ray}$)). In other cases, UE 115-*f* may determine the availability or capability of antenna modules of the UE 115-*f* (e.g., such as the number of antenna modules or spatial separation distances between antenna modules), and UE 115-*f* may indicate the availability of the antenna modules to base station 105-*e*. For example, in some cases, TCI states may be configured (e.g., by the network) with different rank, and base station 105-*e* may configure TCI states based on antenna module information received from the UE 115-*f* (e.g., as well as Rayleigh distance ($d_{Ray}$) calculated at the base station 105-*e* using antenna module information).

At 615, UE 115-*f* may, in some cases, transmit an indication of the beam direction and the rank associated with the beam direction. For example, UE 115-f may indicate (e.g., via feedback or beam report) some TCI state A, as well as an indication of supported rank for TCI state A. In some cases, the UE 115-f may indicate which TCI states (e.g., at base station 105-e) support higher rank transmissions. For example, in some cases, UE 115-f may indicate for which beam directions or TCI states the UE 115-f supports higher rank (e.g., rank-2 or rank-3) transmissions (e.g., as well as which beam directions or TCI states the UE 115-f does not support higher rank transmissions).

At 620, UE 115-f may transmit at least two uncorrelated signals over the beam direction based on the rank associated with the beam direction. For example, UE 115-f may determine, at 610, that UE 115-f is capable of rank-2 transmissions over some TCI state A (e.g., based on a spatial separation distance d between two antenna modules satisfying $d \geq d_{Ray}$). As such, UE 115-f may transmit two uncorrelated signals (e.g., each of the two antenna modules may simultaneously transmit a signal) over the beam direction associated with TCI state A. As such, base station 105-e may receive the at least two uncorrelated signals over the beam direction based on the rank associated with the beam direction (e.g., which may be identified by base station 105-e based on an indication received at 615).

Figure 7:
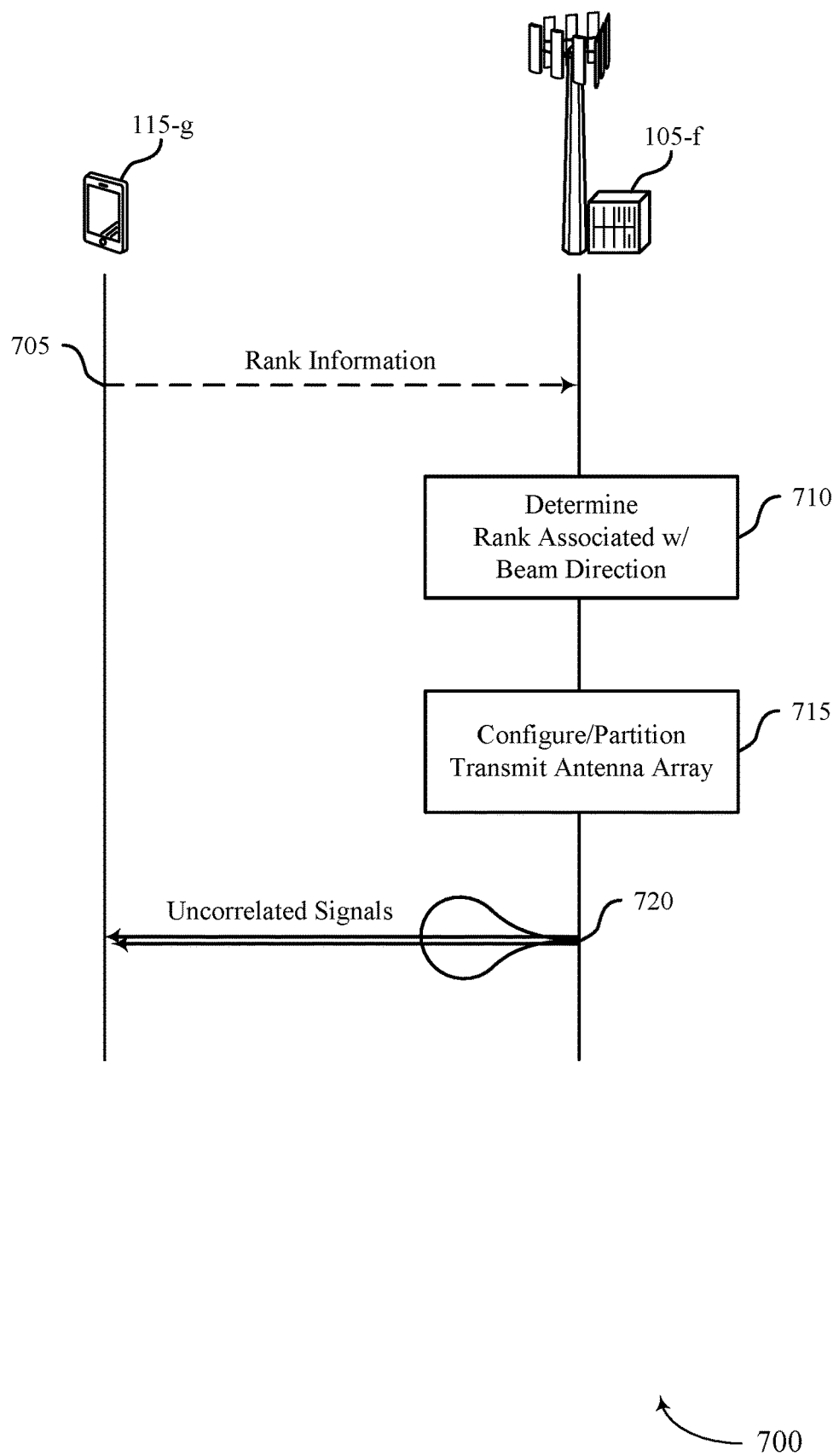
FIG. 7 illustrates an example of a process flow that supports higher rank MIMO enhancements in mmW and sub-THz bands in accordance with aspects of the present disclosure.

FIG. 7 illustrates an example of a process flow 700 that supports higher rank MIMO enhancements in upper mmW bands in accordance with aspects of the present disclosure. In some examples, process flow 700 may implement aspects of wireless communication system 100. Further, process flow 700 may be implemented by a UE 115-g and a base station 105-f, which may be examples of a UE 115 and a base station 105 described with reference to FIGS. 1-6. In the following description of the process flow 700, the operations between UE 115-g and base station 105-f may be transmitted in a different order than the order shown, or the operations performed by base station 105-f and UE 115-g may be performed in different orders or at different times. Some operations may also be left out of the process flow 700, or other operations may be added to the process flow 700. It is to be understood that while base station 105-f and UE 115-g are shown performing a number of the operations of process flow 700, any wireless device may perform the operations shown.

At 705, UE 115-g may transmit rank information to base station 105-f. Generally, rank information may refer to any information or signaling for establishing higher rank MIMO schemes between UE 115-g and base station 105-f. For example, in some cases, UE 115-g may transmit an indication of the beam direction and the rank associated with the beam direction (e.g., such that the base station 105-f and UE 115-g may communicate via higher rank transmissions over the beam direction). In other examples, UE 115-g may transmit other rank information (e.g., in addition to a beam direction) such as positioning information (e.g., positioning information of the UE 115-g, positioning information of a neighbor UE for uncorrelation across two UEs, or spatial separation distance information between the UE 115-g and another UE). Additionally or alternatively, UE 115-g may transmit other rank information such as antenna module information (e.g., a number of antenna modules at UE 115-g, a number of antenna modules at UE 115-g that are available for higher rank transmissions, identifiers of some antenna modules at UE 115-g, one or more spatial separation distances between antenna modules at UE 115-g, or a number of receive or transmit antenna elements at UE 115-g), etc.

In general, UE 115-g may transmit various information (e.g., rank information) that may be used for establishment or configuration of higher rank MIMO schemes (e.g., higher rank directional communications between UE 115-g and base station 105-f). Various positioning information, antenna module information, etc. may be transmitted by UE 115-g for base station 105-f calculation of spatial separation distances (d values) (e.g., d between transmit antenna elements of base station 105-f antenna array, d between UE 115-f antenna modules, or d between UE 115-f and a neighbor UE 115). Various positioning information, antenna module information, etc. may be transmitted by UE 115-g for base station 105-f calculation of Rayleigh distances ($d_{Ray}$) (e.g., $d_{Ray}$ for base station 105-f selection of transmit antenna elements or for base station 105-f antenna array partitioning, $d_{Ray}$ for UE 115-g antenna modules for uncorrelated uplink transmissions (which in some examples, may be indicated back to UE 115-f), $d_{Ray}$ between UE 115-g and a neighbor UE 115 (which in some examples, may be indicated back to UE 115-f and/or the neighbor UE 115). Various positioning information, antenna module information, etc. may be transmitted by UE 115-g for base station 105-f calculation of distances (R) between the UE 115-g and the base station 105-f. Various positioning information, antenna module information, etc. may be transmitted by UE 115-g for base station 105-f calculation of the number of antenna elements (N) of the UE 115-g.

At 710, base station 105-f may determine a beam direction and rank associated with the beam direction (e.g., based on the rank information received at 705). For example, in some cases, base station 105-f may determine the beam direction and rank based off an explicit beam direction and rank indication received at 705. In other cases, base station 105-f may determine beam direction and rank based on other rank information (e.g., other information for establishment of higher rank directional transmissions) such as positioning information, UE 115-f antenna module information, etc.

For example, in cases where UE 115-f indicates a beam direction and positioning information (e.g., positioning information of the UE 115-f and/or positioning information of one or more other neighbor UEs 115), base station 105-e may determine whether the UE 115-f is close enough (e.g., based on a distance R between the UE 115-f and the base station 105-e) for higher rank transmissions (e.g., based on antenna element spatial separation distances (d values) at base station 105-e). In other examples, in cases where UE 115-f indicates a beam direction and positioning information, base station 105-e may determine whether UE 115-f and a neighbor UE 115 are separated by a spatial separation distance (d), such that UE 115-f and the neighbor UE 115 may be capable of simultaneous uncorrelated uplink transmissions to the base station 105-e. In some examples, base station 105-g may determine a number of receive antenna elements of the UE 115-g (e.g., based on rank information, such as antenna module information, received from the UE 115-g at 705), where the rank may be determined based at least in part on the number of receive elements.

At 715, base station 105-f may partition a transmit antenna array, configure a transmit antenna array, select a subset of antenna elements, etc. based on the beam direction and rank for the beam direction determined at 710. For example, base station 105-f may determine spatial separation distances (e.g., d values) between antenna elements of a transmit antenna array that support the determined rank and beam direction. Further, base station 105-f may partition or configure the transmit antenna array based on rank information receive from other UEs 115 (e.g., as described in more detail here, for example, with reference to FIG. 4).

At 720, base station 105-*f* may transmit at least two uncorrelated signals over the beam direction based on the rank associated with the beam direction (e.g., as determined at 715). In some cases, the beam direction may be associated with a LOS path or a NLOS path along a dominant cluster. In some cases, transmitting the at least two uncorrelated signals may refer to transmitting a first signal to UE 115-*g* and transmitting a second signal to another UE 115 (e.g., where the first and second signal may appear uncorrelated at the UE 115-*g* and the another UE 115).

Figure 8:
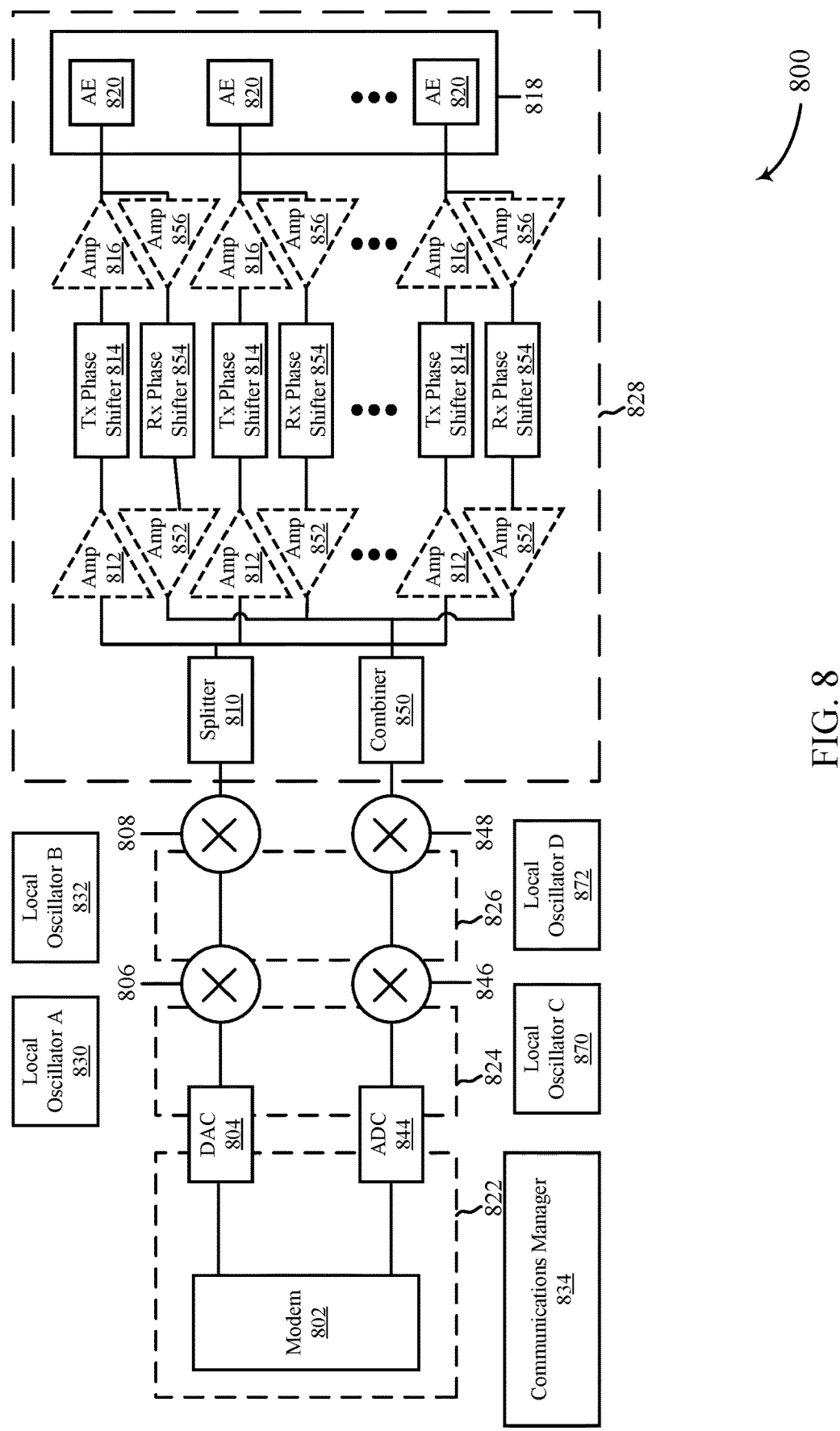
FIG. 8 illustrates an example of an architecture that supports higher rank MIMO enhancements in mmW and sub-THz bands in accordance with aspects of the present disclosure.

FIG. 8 illustrates an example of an architecture 800 that supports determining sub-dominant clusters in a mmW channel in accordance with aspects of the present disclosure. In some examples, architecture 800 may implement aspects of wireless communication systems 100 and/or 201 and/or RSRP tables 300. In some aspects, diagram 800 may be an example of the transmitting device (e.g., a first wireless device) and/or a receiving device (e.g., a second wireless device) as described herein.

Broadly, FIG. 8 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, one example of which is illustrated here. The architecture 800 includes a modem (modulator/demodulator) 802, a digital to analog converter (DAC) 804, a first mixer 806, a second mixer 808, and a splitter 810. The architecture 800 also includes a set of first amplifiers 812, a set of phase shifters 814, a set of second amplifiers 816, and an antenna array 818 that includes a set of antenna elements 820. Transmission lines or other waveguides, wires, traces, or the like are shown connecting the various components to illustrate how signals to be transmitted may travel between components. Boxes 822, 824, 826, and 828 indicate regions in the architecture 800 in which different types of signals travel or are processed. Specifically, box 822 indicates a region in which digital baseband signals travel or are processed, box 824 indicates a region in which analog baseband signals travel or are processed, box 826 indicates a region in which analog intermediate frequency (IF) signals travel or are processed, and box 828 indicates a region in which analog RF signals travel or are processed. The architecture also includes a local oscillator A 830, a local oscillator B 832, and a communications manager 834.

Each of the antenna elements 820 may include one or more sub-elements (not shown) for radiating or receiving RF signals. For example, a single antenna element 820 may include a first sub-element cross-polarized with a second sub-element that can be used to independently transmit cross-polarized signals. The antenna elements 820 may include patch antennas or other types of antennas arranged in a linear, two dimensional, or other pattern. A spacing between antenna elements 820 may be such that signals with a desired wavelength transmitted separately by the antenna elements 820 may interact or interfere (e.g., to form a desired beam). For example, given an expected range of wavelengths or frequencies, the spacing may provide a quarter wavelength, half wavelength, or other fraction of a wavelength of spacing between neighboring antenna elements 820 to allow for interaction or interference of signals transmitted by the separate antenna elements 820 within that expected range.

The modem 802 processes and generates digital baseband signals and may also control operation of the DAC 804, first and second mixers 806, 808, splitter 810, first amplifiers 812, phase shifters 814, and/or the second amplifiers 816 to transmit signals via one or more or all of the antenna elements 820. The modem 802 may process signals and control operation in accordance with a communication standard such as a wireless standard discussed herein. The DAC 804 may convert digital baseband signals received from the modem 802 (and that are to be transmitted) into analog baseband signals. The first mixer 806 upconverts analog baseband signals to analog IF signals within an IF using a local oscillator A 830. For example, the first mixer 806 may mix the signals with an oscillating signal generated by the local oscillator A 830 to "move" the baseband analog signals to the IF. In some cases, some processing or filtering (not shown) may take place at the IF. The second mixer 808 upconverts the analog IF signals to analog RF signals using the local oscillator B 832. Similarly to the first mixer, the second mixer 808 may mix the signals with an oscillating signal generated by the local oscillator B 832 to "move" the IF analog signals to the RF, or the frequency at which signals will be transmitted or received. The modem 802 and/or the communications manager 834 may adjust the frequency of local oscillator A 830 and/or the local oscillator B 832 so that a desired IF and/or RF frequency is produced and used to facilitate processing and transmission of a signal within a desired bandwidth.

In the illustrated architecture 800, signals upconverted by the second mixer 808 are split or duplicated into multiple signals by the splitter 810. The splitter 810 in architecture 800 splits the RF signal into a set of identical or nearly identical RF signals, as denoted by its presence in box 828. In other examples, the split may take place with any type of signal including with baseband digital, baseband analog, or IF analog signals. Each of these signals may correspond to an antenna element 820 and the signal travels through and is processed by amplifiers 812, 816, phase shifters 814, and/or other elements corresponding to the respective antenna element 820 to be provided to and transmitted by the corresponding antenna element 820 of the antenna array 818. In one example, the splitter 810 may be an active splitter that is connected to a power supply and provides some gain so that RF signals exiting the splitter 810 are at a power level equal to or greater than the signal entering the splitter 810. In another example, the splitter 810 is a passive splitter that is not connected to power supply and the RF signals exiting the splitter 810 may be at a power level lower than the RF signal entering the splitter 810.

After being split by the splitter 810, the resulting RF signals may enter an amplifier, such as a first amplifier 812, or a phase shifter 814 corresponding to an antenna element 820. The first and second amplifiers 812, 816 are illustrated with dashed lines because one or both of them might not be necessary in some implementations. In one implementation, both the first amplifier 812 and second amplifier 816 are present. In another, neither the first amplifier 812 nor the second amplifier 816 is present. In other implementations, one of the two amplifiers 812, 816 is present but not the other. By way of example, if the splitter 810 is an active splitter, the first amplifier 812 may not be used. By way of further example, if the phase shifter 814 is an active phase shifter that can provide a gain, the second amplifier 816 might not be used. The amplifiers 812, 816 may provide a desired level of positive or negative gain. A positive gain (positive dB) may be used to increase an amplitude of a signal for radiation by a specific antenna element 820. A negative gain (negative dB) may be used to decrease an amplitude and/or suppress radiation of the signal by a specific antenna element. Each of the amplifiers 812, 816 may be controlled independently (e.g., by the modem 802 or communications manager 834) to provide independent control of the gain for each antenna element 820. For example, the modem 802 and/or the communications manager 834 may have at least one control line connected to each of the splitter 810, first amplifiers 812, phase shifters 814, and/or second amplifiers 816 which may be used to configure a gain to provide a desired amount of gain for each component and thus each antenna element 820.

The phase shifter 814 may provide a configurable phase shift or phase offset to a corresponding RF signal to be transmitted. The phase shifter 814 could be a passive phase shifter not directly connected to a power supply. Passive phase shifters might introduce some insertion loss. The second amplifier 816 could boost the signal to compensate for the insertion loss. The phase shifter 814 could be an active phase shifter connected to a power supply such that the active phase shifter provides some amount of gain or prevents insertion loss. The settings of each of the phase shifters 814 are independent meaning that each can be set to provide a desired amount of phase shift or the same amount of phase shift or some other configuration. The modem 802 and/or the communications manager 834 may have at least one control line connected to each of the phase shifters 814 and which may be used to configure the phase shifters 814 to provide a desired amounts of phase shift or phase offset between antenna elements 820.

In the illustrated architecture 800, RF signals received by the antenna elements 820 are provided to one or more of first amplifier 856 to boost the signal strength. The first amplifier 856 may be connected to the same antenna arrays 818, e.g., for TDD operations. The first amplifier 856 may be connected to different antenna arrays 818. The boosted RF signal is input into one or more of phase shifter 854 to provide a configurable phase shift or phase offset for the corresponding received RF signal. The phase shifter 854 may be an active phase shifter or a passive phase shifter. The settings of the phase shifters 854 are independent, meaning that each can be set to provide a desired amount of phase shift or the same amount of phase shift or some other configuration. The modem 802 and/or the communications manager 834 may have at least one control line connected to each of the phase shifters 854 and which may be used to configure the phase shifters 854 to provide a desired amount of phase shift or phase offset between antenna elements 820.

The outputs of the phase shifters 854 may be input to one or more second amplifiers 852 for signal amplification of the phase shifted received RF signals. The second amplifiers 852 may be individually configured to provide a configured amount of gain. The second amplifiers 852 may be individually configured to provide an amount of gain to ensure that the signal input to combiner 850 have the same magnitude. The amplifiers 852 and/or 856 are illustrated in dashed lines because they might not be necessary in some implementations. In one implementation, both the amplifier 852 and the amplifier 856 are present. In another, neither the amplifier 852 nor the amplifier 856 are present. In other implementations, one of the amplifiers 852, 856 is present but not the other.

In the illustrated architecture 800, signals output by the phase shifters 854 (via the amplifiers 852 when present) are combined in combiner 850. The combiner 850 in architecture combines the RF signal into a signal, as denoted by its presence in box 828. The combiner 850 may be a passive combiner, e.g., not connected to a power source, which may result in some insertion loss. The combiner 850 may be an active combiner, e.g., connected to a power source, which may result in some signal gain. When combiner 850 is an active combiner, it may provide a different (e.g., configurable) amount of gain for each input signal so that the input signals have the same magnitude when they are combined. When combiner 850 is an active combiner, it may not need the second amplifier 852 because the active combiner may provide the signal amplification.

The output of the combiner 850 is input into mixers 848 and 846. Mixers 848 and 846 generally down convert the received RF signal using inputs from local oscillators 872 and 870, respectively, to create intermediate or baseband signals that carry the encoded and modulated information. The output of the mixers 848 and 846 are input into an analog-to-digital converter (ADC) 844 for conversion to analog signals. The analog signals output from ADC 844 is input to modem 802 for baseband processing, e.g., decoding, de-interleaving, etc.

The architecture 800 is given by way of example to illustrate an architecture for transmitting and/or receiving signals. It will be understood that the architecture 800 and/or each portion of the architecture 800 may be repeated multiple times within an architecture to accommodate or provide an arbitrary number of RF chains, antenna elements, and/or antenna panels. Furthermore, numerous alternate architectures are possible and contemplated. For example, although a single antenna array 818 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions.

Furthermore, mixers, splitters, amplifiers, phase shifters and other components may be located in different signal type areas (e.g., different ones of the boxes 822, 824, 826, 828) in different implemented architectures. For example, a split of the signal to be transmitted into a set of signals may take place at the analog RF, analog IF, analog baseband, or digital baseband frequencies in different examples. Similarly, amplification, and/or phase shifts may also take place at different frequencies. For example, in some contemplated implementations, one or more of the splitter 810, amplifiers 812, 816, or phase shifters 814 may be located between the DAC 804 and the first mixer 806 or between the first mixer 806 and the second mixer 808. In one example, the functions of one or more of the components may be combined into one component. For example, the phase shifters 814 may perform amplification to include or replace the first and/or or second amplifiers 812, 816. By way of another example, a phase shift may be implemented by the second mixer 808 to obviate the need for a separate phase shifter 814. This technique is sometimes called local oscillator phase shifting. In one implementation of this configuration, there may be a set of IF to RF mixers (e.g., for each antenna element chain) within the second mixer 808 and the local oscillator B 832 would supply different local oscillator signals (with different phase offsets) to each IF to RF mixer.

The modem 802 and/or the communications manager 834 may control one or more of the other components 804-872 to select one or more antenna elements 820 and/or to form beams for transmission of one or more signals. For example, the antenna elements 820 may be individually selected or deselected for transmission of a signal (or signals) by controlling an amplitude of one or more corresponding amplifiers, such as the first amplifiers 812 and/or the second amplifiers 816. Beamforming includes generation of a beam using a set of signals on different antenna elements where one or more or all of the set signals are shifted in phase relative to each other. The formed beam may carry physical or higher layer reference signals or information. As each signal of the set of signals is radiated from a respective antenna element 820, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 818) can be dynamically controlled by modifying the phase shifts or phase offsets imparted by the phase shifters 814 and amplitudes imparted by the amplifiers 812, 816 of the set of signals relative to each other.

The communications manager 834 may, when architecture 800 is configured as a transmitting device, determine a spatial separation distance between at least two transmitting entities or at least two receiving entities, determine a rank associated with a beam direction based on the spatial separation distance for the at least two transmitting entities or the at least two receiving entities, and transmit at least two uncorrelated signals over the beam direction based on the rank associated with the beam direction, as discussed herein. The communications manager 834 may, when architecture 800 is configured as a receiving device, transmit an indication of a beam direction and a rank associated with the beam direction and receive at least one signal over the beam direction based on the rank associated with the beam direction. The communications manager 834 may, when architecture 800 is configured as a receiving device, receive an indication of a beam direction and a rank associated with the beam direction and receive at least two uncorrelated signals over the beam direction based on the rank associated with the beam direction. The communications manager 834 may be located partially or fully within one or more other components of the architecture 800. For example, the communications manager 834 may be located within the modem 802 in at least one implementation.

Figure 9:
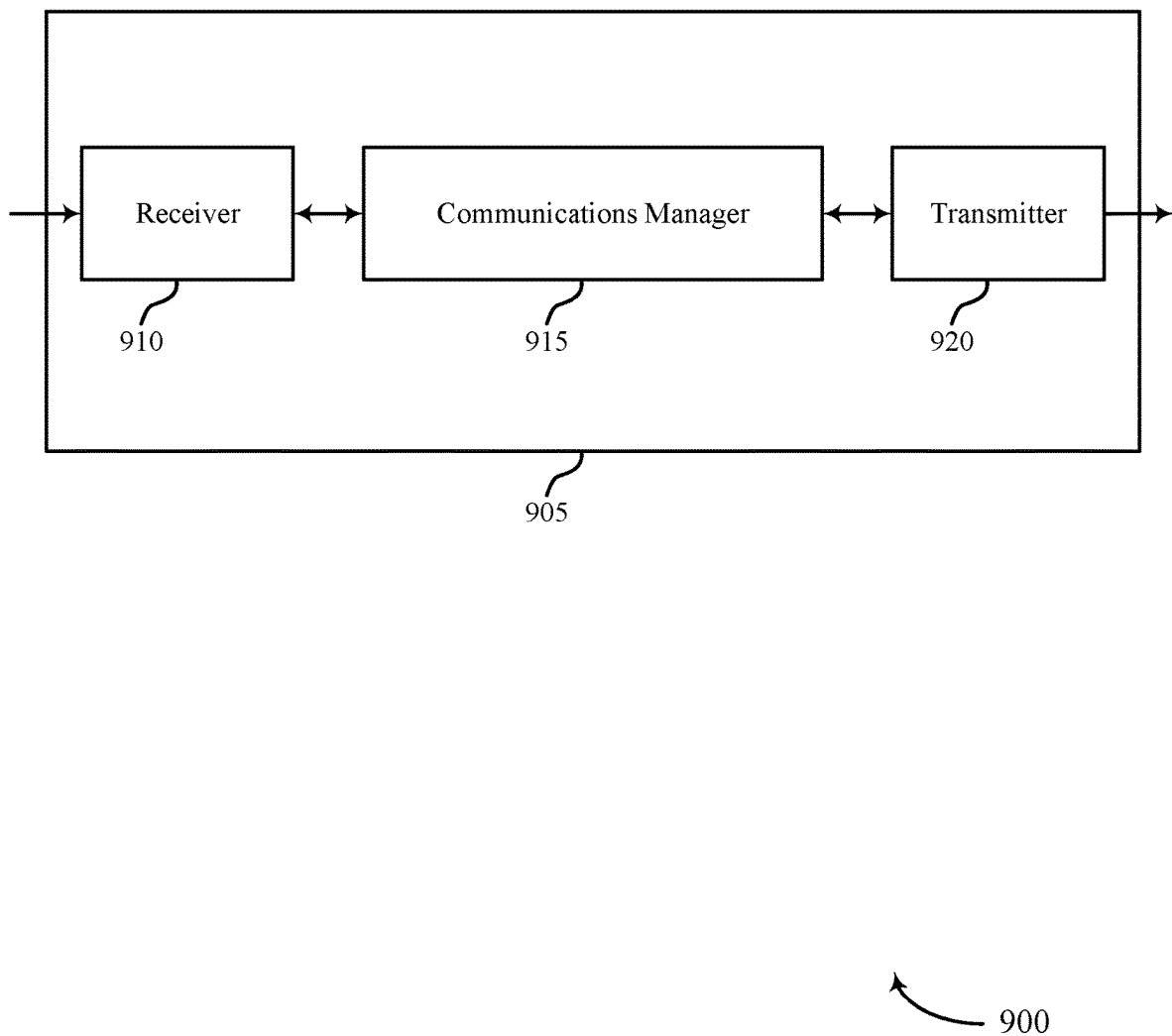
FIGS. 9 and 10 show block diagrams of devices that support higher rank MIMO enhancements in mmW and sub-THz bands in accordance with aspects of the present disclosure.

FIG. 9 shows a block diagram 900 of a device 905 that supports higher rank MIMO enhancements in upper mmW bands in accordance with aspects of the present disclosure. The device 905 may be an example of aspects of a UE 115 or base station 105. The device 905 may include a receiver 910, a communications manager 915, and a transmitter 920. The device 905 may also include a processor. Each of these components may be in communication with one another (e.g., via one or more buses).

Receiver 910 may receive information such as packets, user data, or control information associated with various information channels (e.g., control channels, data channels, and information related to higher rank MIMO enhancements in upper mmW bands). Information may be passed on to other components of the device. The receiver 910 may be an example of aspects of the transceiver 1820 or the transceiver 1920 described with reference to FIGS. 18 and 19. The receiver 910 may utilize a single antenna or a set of antennas.

The communications manager 915 may transmit an indication of a beam direction and a rank associated with the beam direction and receive at least one signal over the beam direction based on the rank associated with the beam direction. The communications manager 915 may be an example of aspects of the communications manager 1810 or 1910 as described herein.

The actions performed by the communications manager 915 as described herein may be implemented to realize one or more potential advantages. For example, utilizing uncorrelated entities (e.g., uncorrelated devices 905, uncorrelated antenna modules, or uncorrelated antenna elements) for higher rank MIMO schemes may allow for improved wireless performance in terms of increased throughput rate and beam robustness across different antenna modules. For example, device 905 may efficiently indicate support of various higher rank MIMO schemes and provide for efficient implementation of higher rank MIMO schemes, such that higher throughput rates may be achieved.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 920 may transmit signals generated by other components of the device. In some examples, the transmitter 920 may be collocated with a receiver 910 in a transceiver module. For example, the transmitter 920 may be an example of aspects of the transceiver 1820 or the transceiver 1920 described with reference to FIGS. 18 and 19. The transmitter 920 may utilize a single antenna or a set of antennas.

Figure 10:
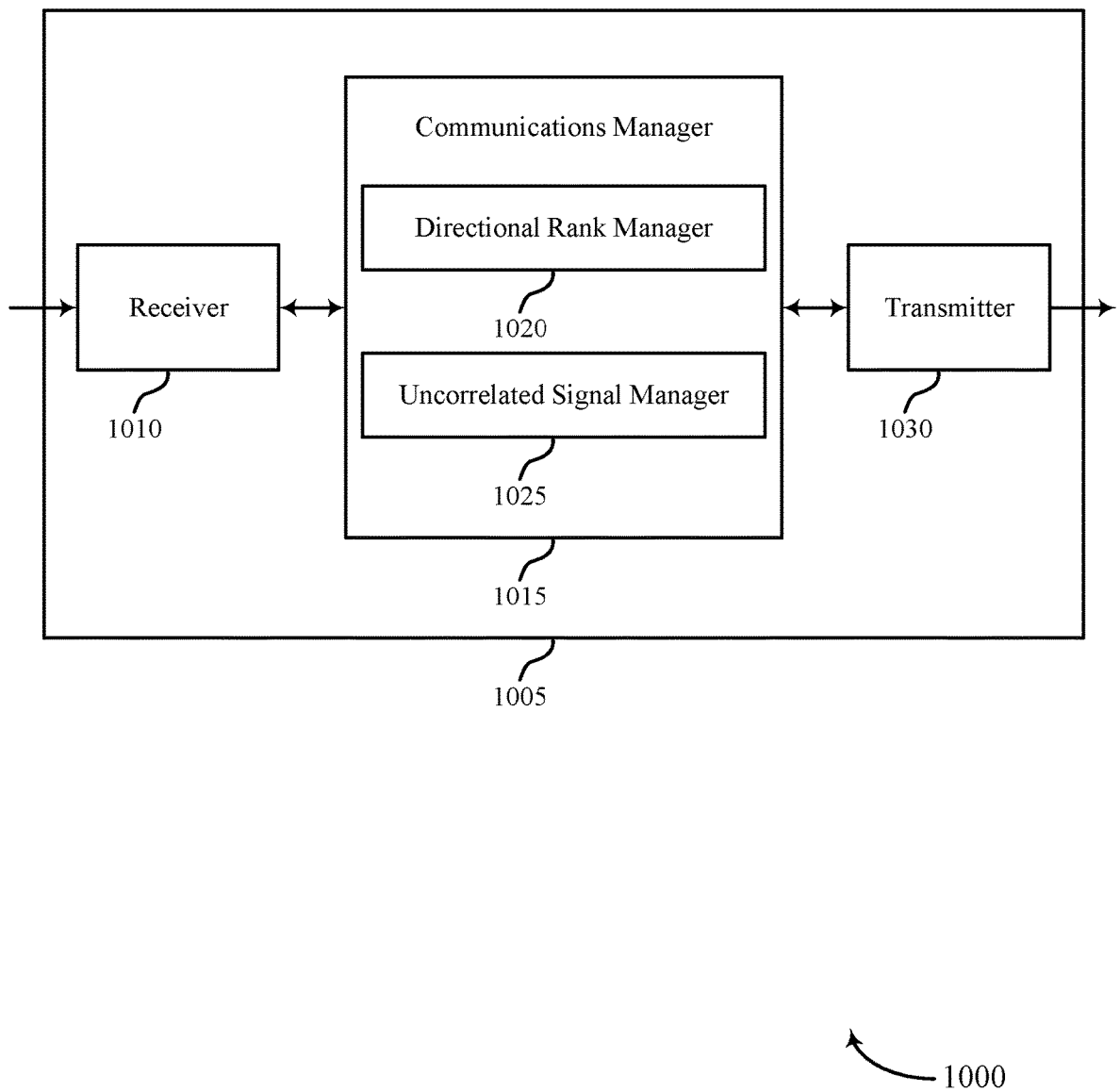

FIG. 10 shows a block diagram 1000 of a device 1005 that supports higher rank MIMO enhancements in upper mmW bands in accordance with aspects of the present disclosure. The device 1005 may be an example of aspects of a device 905, a UE 115, or a base station 105 as described herein. The device 1005 may include a receiver 1010, a communications manager 1015, and a transmitter 1030. The device 1005 may also include a processor. Each of these components may be in communication with one another (e.g., via one or more buses).

Receiver 1010 may receive information such as packets, user data, or control information associated with various information channels (e.g., control channels, data channels, and information related to higher rank MIMO enhancements in upper mmW bands). Information may be passed on to other components of the device. The receiver 1010 may be an example of aspects of the transceiver 1820 or the transceiver 1920 described with reference to FIGS. 18 and 19. The receiver 1010 may utilize a single antenna or a set of antennas.

The communications manager 1015 may be an example of aspects of the communications manager 915 as described herein. The communications manager 1015 may include a directional rank manager 1020 and an uncorrelated signal manager 1025. The communications manager 1015 may be an example of aspects of the communications manager 1810 or 1910 as described herein.

The directional rank manager 1020 may transmit an indication of a beam direction and a rank associated with the beam direction. The uncorrelated signal manager 1025 may receive at least one signal over the beam direction based on the rank associated with the beam direction.

Transmitter 1030 may transmit signals generated by other components of the device. In some examples, the transmitter 1030 may be collocated with a receiver 1010 in a transceiver module. For example, the transmitter 1030 may be an example of aspects of the transceiver 1820 or the transceiver 1920 described with reference to FIGS. 18 and 19. The transmitter 1030 may utilize a single antenna or a set of antennas.

Figure 11:
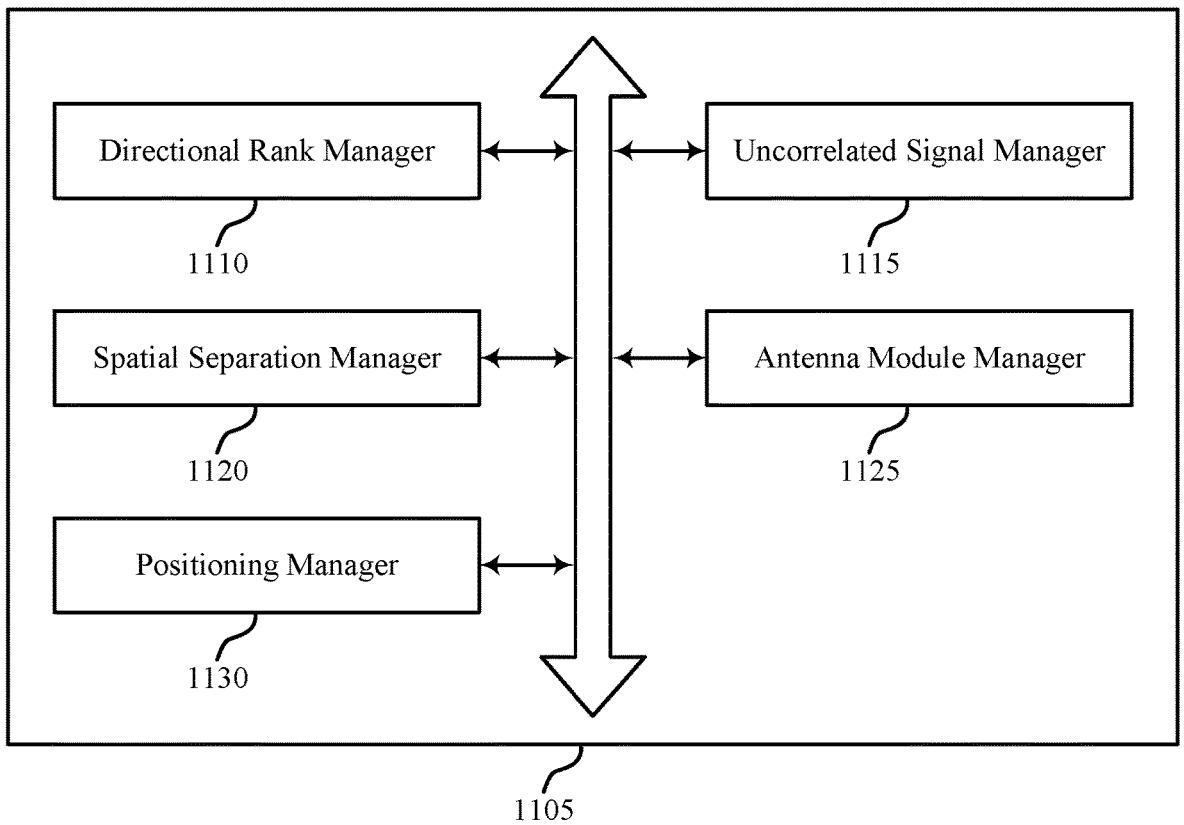
FIG. 11 shows a block diagram of a communications manager that supports higher rank MIMO enhancements in mmW and sub-THz bands in accordance with aspects of the present disclosure.

FIG. 11 shows a block diagram 1100 of a communications manager 1105 that supports higher rank MIMO enhancements in upper mmW bands in accordance with aspects of the present disclosure. The communications manager 1105 may be an example of aspects of a communications manager 915, a communications manager 1015, a communications manager 1810, or a communications manager 1910 described herein. The communications manager 1105 may include a directional rank manager 1110, an uncorrelated signal manager 1115, a spatial separation manager 1120, an antenna module manager 1125, and a positioning manager 1130. Each of these modules may communicate, directly or indirectly, with one another (e.g., via one or more buses).

The directional rank manager 1110 may transmit an indication of a beam direction and a rank associated with the beam direction. In some examples, the directional rank manager 1110 may receive a first signal over the beam direction based on the transmitted indication. In some cases, the rank associated with the beam direction is based on a number of receive antennas associated with the first device.

The uncorrelated signal manager 1115 may receive at least one signal over the beam direction based on the rank associated with the beam direction. In some examples, the uncorrelated signal manager 1115 may receive at least two uncorrelated signals over the beam direction based on the transmitted indication. In some examples, the uncorrelated signal manager 1115 may receive an indication that the first signal corresponds to the first wireless device and that a second signal corresponds to a second wireless device, where the first signal and the second signal include two uncorrelated signals over the beam direction.

The spatial separation manager 1120 may determine a distance between the first wireless device and a second wireless device, where the indication is transmitted based on the distance. In some examples, the spatial separation manager 1120 may determine a spatial separation between the first wireless device and a second wireless device, where the indication is transmitted to a third wireless device based on the determined spatial separation between the first wireless device and the second wireless device.

The antenna module manager 1125 may determine a number of antenna modules at the first wireless device, where the indication is transmitted based on the number of antenna modules. In some cases, the indication includes an indication of the number of antenna modules.

The positioning manager 1130 may transmit positioning information of the first wireless device to the second wireless device. In some examples, the positioning manager 1130 may receive positioning information of the second wireless device from the second wireless device, where the spatial separation between the first wireless device and the second wireless device is determined based on the received positioning information of the second wireless device.

Figure 12:
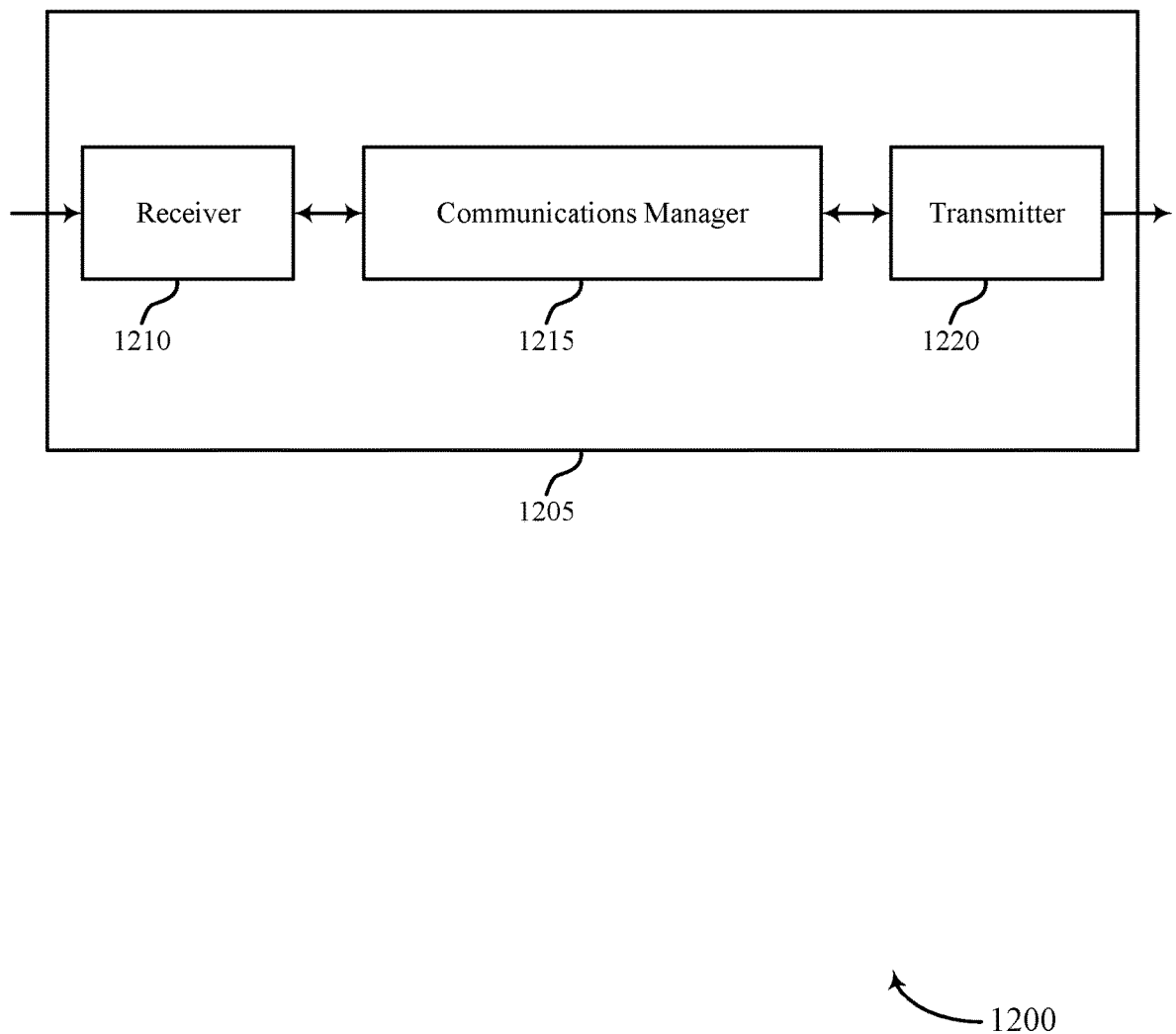
FIGS. 12 and 13 show block diagrams of devices that support higher rank MIMO enhancements in mmW and sub-THz bands in accordance with aspects of the present disclosure.

FIG. 12 shows a block diagram 1200 of a device 1205 that supports higher rank MIMO enhancements in upper mmW bands in accordance with aspects of the present disclosure. The device 1205 may be an example of aspects of a UE 115 or a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to higher rank MIMO enhancements in upper mmW bands). Information may be passed on to other components of the device 1205. The receiver 1210 may be an example of aspects of the transceiver 1820 or the transceiver 1920 described with reference to FIGS. 18 and 19. The receiver 1210 may utilize a single antenna or a set of antennas.

The communications manager 1215 may receive an indication of a beam direction and a rank associated with the beam direction and receive at least two uncorrelated signals over the beam direction based on the rank associated with the beam direction. The communications manager 1215 may be an example of aspects of the communications manager 1810 or 1910 as described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1820 or the transceiver 1920 described with reference to FIGS. 18 and 19. The transmitter 1220 may utilize a single antenna or a set of antennas.

Figure 13:
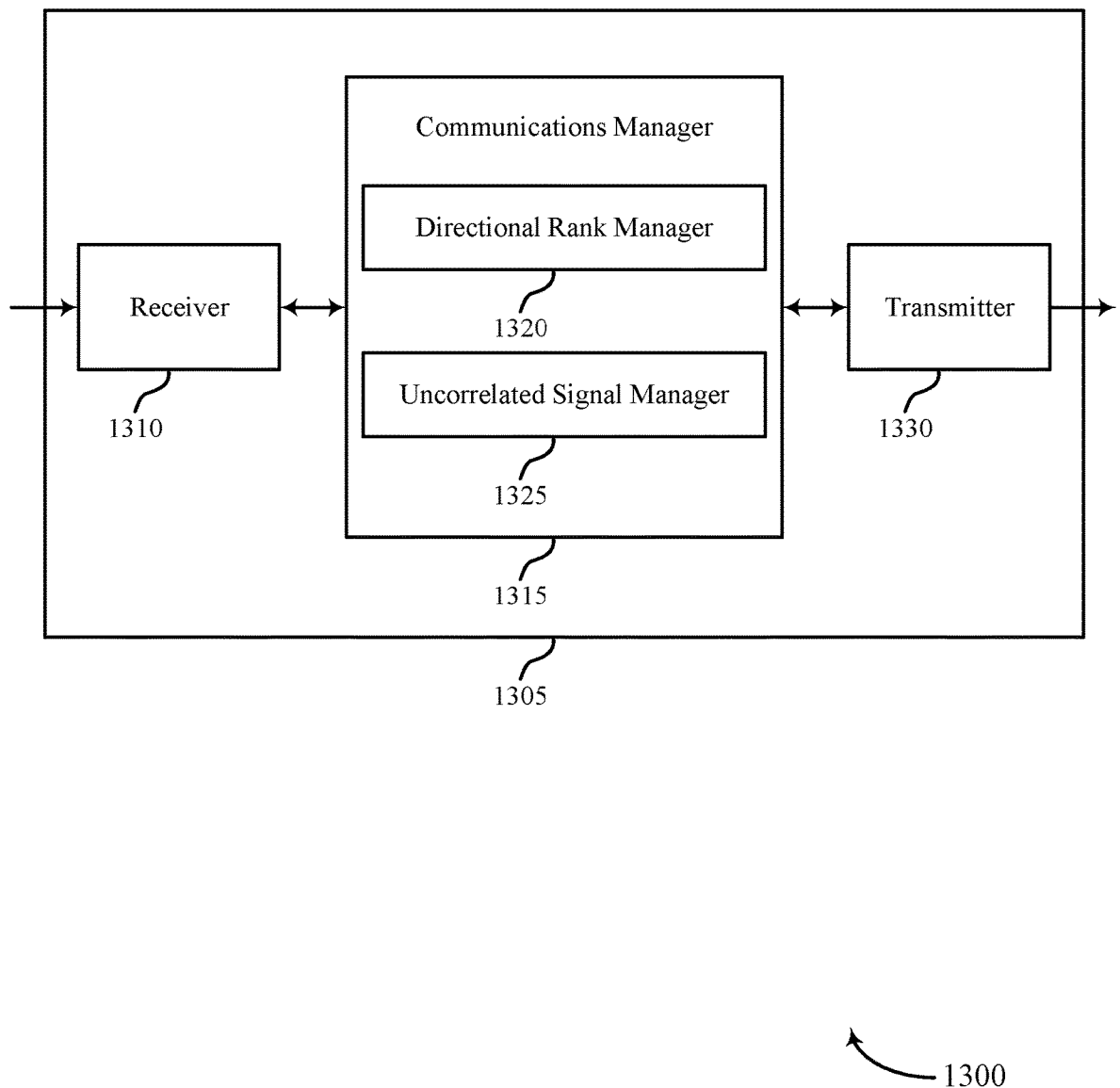

FIG. 13 shows a block diagram 1300 of a device 1305 that supports higher rank MIMO enhancements in upper mmW bands in accordance with aspects of the present disclosure. The device 1305 may be an example of aspects of a device 1205, a UE 115, or a base station 105 as described herein. The device 1305 may include a receiver 1310, a communications manager 1315, and a transmitter 1330. The device 1305 may also include a processor. Each of these components may be in communication with one another (e.g., via one or more buses).

The receiver 1310 may receive information such as packets, user data, or control information associated with various information channels (e.g., control channels, data channels, and information related to higher rank MIMO enhancements in upper mmW bands). Information may be passed on to other components of the device 1305. The receiver 1310 may be an example of aspects of the transceiver 1820 or the transceiver 1920 described with reference to FIGS. 18 and 19. The receiver 1310 may utilize a single antenna or a set of antennas.

The communications manager 1315 may be an example of aspects of the communications manager 1215 as described herein. The communications manager 1315 may include a directional rank manager 1320 and an uncorrelated signal manager 1325. The communications manager 1315 may be an example of aspects of the communications manager 1810 or 1910 as described herein.

The directional rank manager 1320 may receive an indication of a beam direction and a rank associated with the beam direction. The uncorrelated signal manager 1325 may receive at least two uncorrelated signals over the beam direction based on the rank associated with the beam direction.

The transmitter 1330 may transmit signals generated by other components of the device 1305. In some examples, the transmitter 1330 may be collocated with a receiver 1310 in a transceiver module. For example, the transmitter 1330 may be an example of aspects of the transceiver 1820 or the transceiver 1920 described with reference to FIGS. 18 and 19. The transmitter 1330 may utilize a single antenna or a set of antennas.

Figure 14:
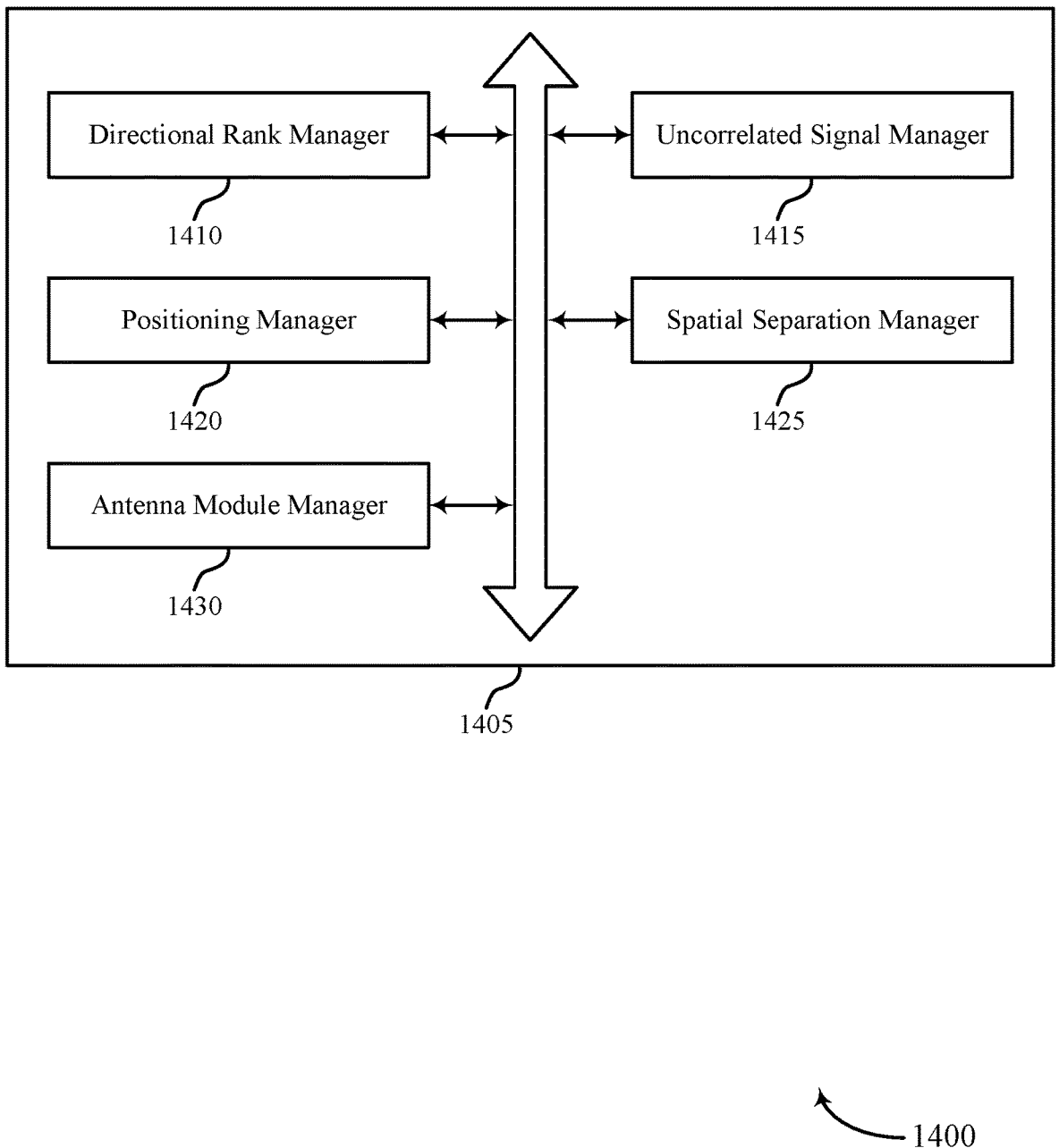
FIG. 14 shows a block diagram of a communications manager that supports higher rank MIMO enhancements in mmW and sub-THz bands in accordance with aspects of the present disclosure.

FIG. 14 shows a block diagram 1400 of a communications manager 1405 that supports higher rank MIMO enhancements in upper mmW bands in accordance with aspects of the present disclosure. The communications manager 1405 may be an example of aspects of a communications manager 1215, a communications manager 1315, communications manager 1810, or communications manager 1910 as described herein. The communications manager 1405 may include a directional rank manager 1410, an uncorrelated signal manager 1415, a positioning manager 1420, a spatial separation manager 1425, and an antenna module manager 1430. Each of these modules may communicate, directly or indirectly, with one another (e.g., via one or more buses).

The directional rank manager 1410 may receive an indication of a beam direction and a rank associated with the beam direction. In some cases, the indication of the beam direction and the rank associated with the beam direction includes a capability of a second wireless device and a third wireless device to transmit uncorrelated signals to the first wireless device over the beam direction.

The uncorrelated signal manager 1415 may receive at least two uncorrelated signals over the beam direction based on the rank associated with the beam direction. In some examples, the uncorrelated signal manager 1415 may receive a first signal over the beam direction from a second wireless device. In some examples, the uncorrelated signal manager 1415 may receive a second signal over the beam direction from a third wireless device, where the first signal and the second signal are uncorrelated at the first wireless device. In some cases, the at least two uncorrelated signals over the beam direction are received from a second wireless device.

The positioning manager 1420 may receive a first positioning signal from a second wireless device. In some examples, the positioning manager 1420 may receive a second positioning signal from a third wireless device. In some examples, the positioning manager 1420 may transmit positioning information of the third wireless device to the second wireless device, where the indication of the beam direction and the rank associated with the beam direction is received from the second wireless device based on the transmitted positioning information.

The spatial separation manager 1425 may determine a distance between the second wireless device and the third wireless device based on the received first positioning signal and the received second positioning signal. In some examples, the spatial separation manager 1425 may transmit an indication of the distance to the second wireless device and the third wireless device, where the indication of the beam direction and the rank associated with the beam direction is received based on the transmitted indication of the distance.

The antenna module manager 1430 may receive an indication of antenna module availability of a second wireless device to transmit the at least two uncorrelated signals over the beam direction, where the at least two uncorrelated signals are received based on the received indication of the antenna module availability of the second wireless device.

Figure 15:
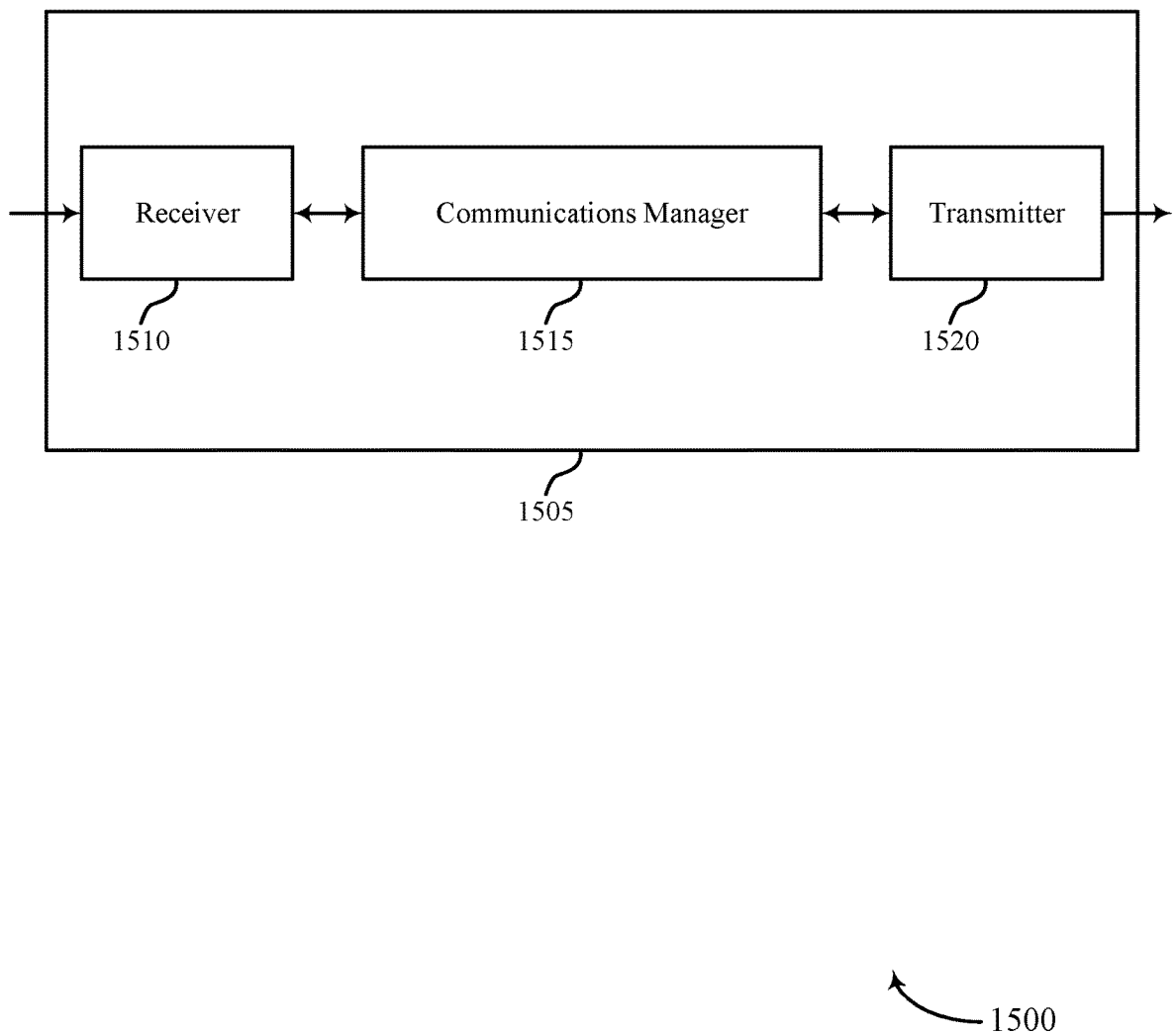
FIGS. 15 and 16 show block diagrams of devices that support higher rank MIMO enhancements in mmW and sub-THz bands in accordance with aspects of the present disclosure.

FIG. 15 shows a block diagram 1500 of a device 1505 that supports higher rank MIMO enhancements in upper mmW bands in accordance with aspects of the present disclosure. The device 1505 may be an example of aspects of a UE 115 or base station 105 as described herein. The device 1505 may include a receiver 1510, a communications manager 1515, and a transmitter 1520. The device 1505 may also include a processor. Each of these components may be in communication with one another (e.g., via one or more buses).

Receiver 1510 may receive information such as packets, user data, or control information associated with various information channels (e.g., control channels, data channels, and information related to higher rank MIMO enhancements in upper mmW bands). Information may be passed on to other components of the device 1505. The receiver 1510 may be an example of aspects of the transceiver 1820 or the transceiver 1920 as described with reference to FIGS. 18 and 19. The receiver 1510 may utilize a single antenna or a set of antennas.

The communications manager 1515 may determine a spatial separation distance between at least two transmitting entities or at least two receiving entities, determine a rank associated with a beam direction based on the spatial separation distance for the at least two transmitting entities or the at least two receiving entities, and transmit at least two uncorrelated signals over the beam direction based on the rank associated with the beam direction. The communications manager 1515 may be an example of aspects of the communications manager 1810 or 1910 as described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 or the transceiver 1920 as described with reference to FIGS. 18 and 19. The transmitter 1520 may utilize a single antenna or a set of antennas.

Figure 16:
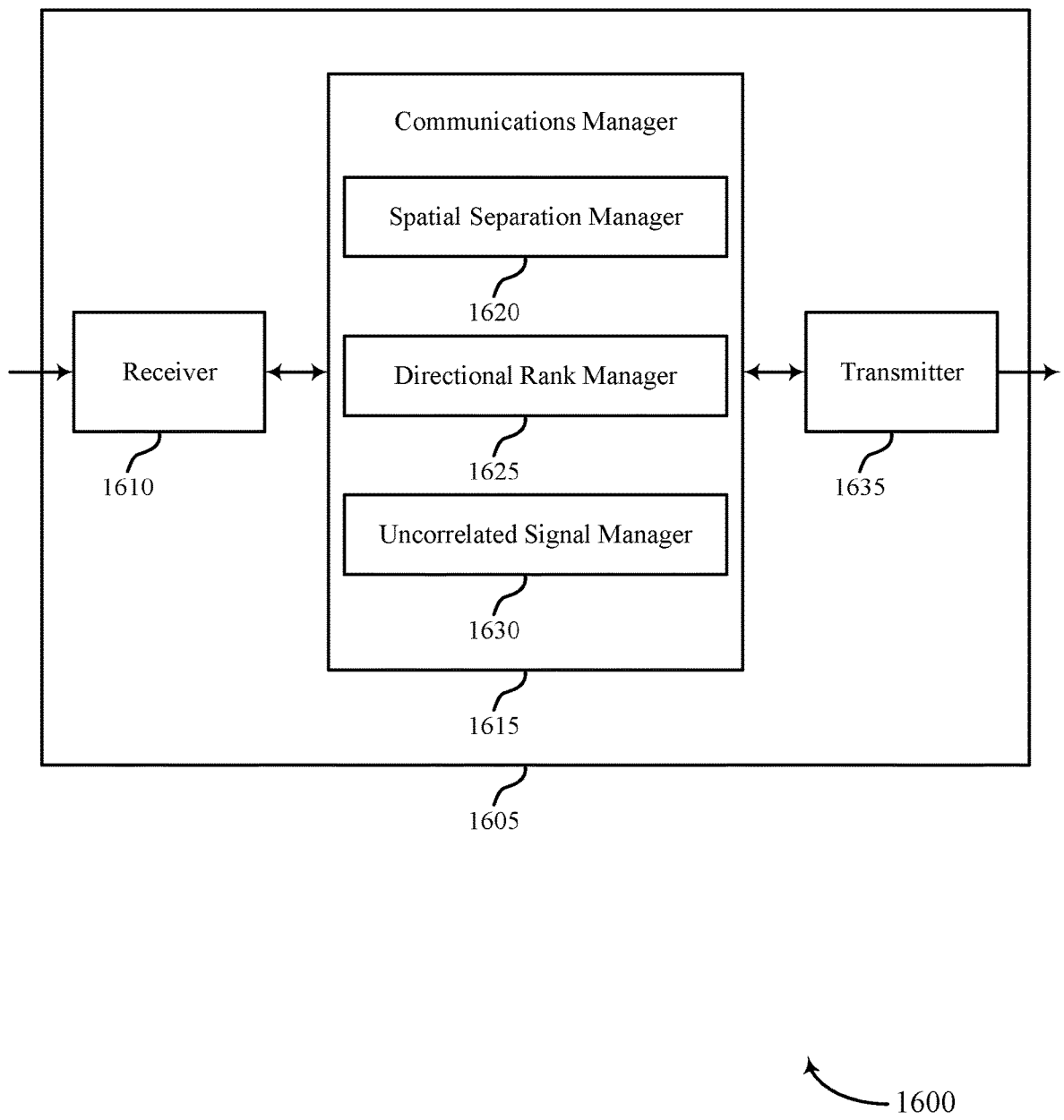

FIG. 16 shows a block diagram 1600 of a device 1605 that supports higher rank MIMO enhancements in upper mmW bands in accordance with aspects of the present disclosure. The device 1605 may be an example of aspects of a device 1505, a UE 115, or a base station 105 as described herein. The device 1605 may include a receiver 1610, a communications manager 1615, and a transmitter 1635. The device 1605 may also include a processor. Each of these components may be in communication with one another (e.g., via one or more buses).

Receiver 1610 may receive information such as packets, user data, or control information associated with various information channels (e.g., control channels, data channels, and information related to higher rank MIMO enhancements in upper mmW bands). Information may be passed on to other components of the device 1605. The receiver 1610 may be an example of aspects of the transceiver 1820 or the transceiver 1920 as described with reference to FIGS. 18 and 19. The receiver 1610 may utilize a single antenna or a set of antennas.

The communications manager 1615 may be an example of aspects of the communications manager 1515 as described herein. The communications manager 1615 may include a spatial separation manager 1620, a directional rank manager 1625, and an uncorrelated signal manager 1630. The communications manager 1615 may be an example of aspects of the communications manager 1810 or 1910 as described herein.

The spatial separation manager 1620 may determine a spatial separation distance between at least two transmitting entities or at least two receiving entities. The directional rank manager 1625 may determine a rank associated with a beam direction based on the spatial separation distance for the at least two transmitting entities or the at least two receiving entities. The uncorrelated signal manager 1630 may transmit at least two uncorrelated signals over the beam direction based on the rank associated with the beam direction.

Transmitter 1635 may transmit signals generated by other components of the device 1605. In some examples, the transmitter 1635 may be collocated with a receiver 1610 in a transceiver module. For example, the transmitter 1635 may be an example of aspects of the transceiver 1820 or 1920 as described with reference to FIGS. 18 and 19. The transmitter 1635 may utilize a single antenna or a set of antennas.

Figure 17:
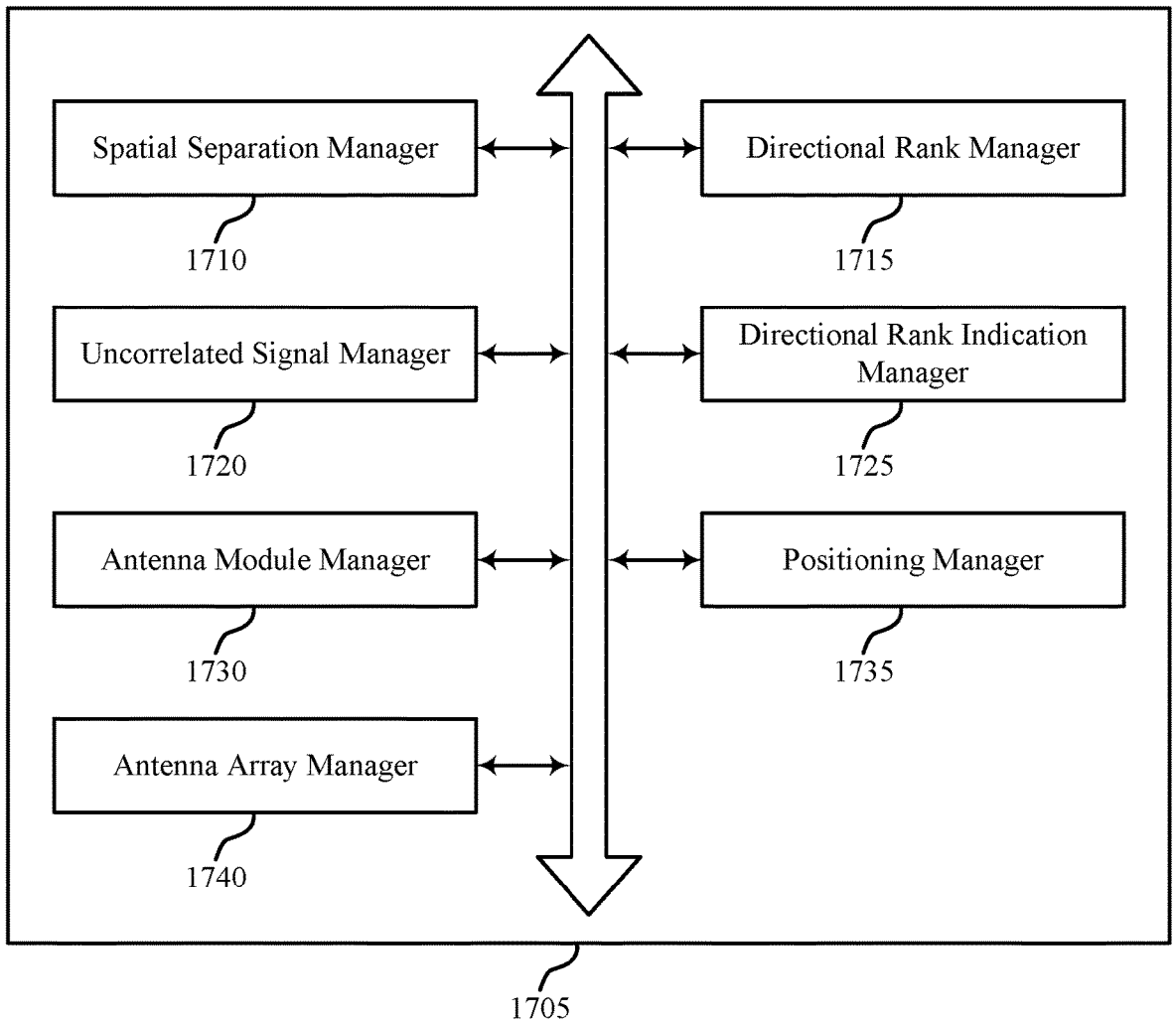
FIG. 17 shows a block diagram of a communications manager that supports higher rank MIMO enhancements in mmW and sub-THz bands in accordance with aspects of the present disclosure.

FIG. 17 shows a block diagram 1700 of a communications manager 1705 that supports higher rank MIMO enhancements in upper mmW bands in accordance with aspects of the present disclosure. The communications manager 1705 may be an example of aspects of a communications manager 1515, a communications manager 1615, a communications manager 1810, or a communications manager 1910 described herein. The communications manager 1705 may include a spatial separation manager 1710, a directional rank manager 1715, an uncorrelated signal manager 1720, a directional rank indication manager 1725, an antenna module manager 1730, a positioning manager 1735, and an antenna array manager 1740. Each of these modules may communicate, directly or indirectly, with one another (e.g., via one or more buses).

The spatial separation manager 1710 may determine a spatial separation distance between at least two transmitting entities or at least two receiving entities. In some examples, the spatial separation manager 1710 may determine a spatial separation between at least two antenna modules of the first wireless device. In some examples, the spatial separation manager 1710 may determine a spatial separation between the first wireless device and a second wireless device. In some examples, the spatial separation manager 1710 may determine a spatial separation between a first antenna element of the first wireless device and a second antenna element of the first wireless device.

The directional rank manager 1715 may determine a rank associated with a beam direction based on the spatial separation distance for the at least two transmitting entities or the at least two receiving entities. In some examples, the directional rank manager 1715 may determine a number of independent layers that can be processed with analog precoding for transmitting or receiving uncorrelated signals over the beam direction based on the spatial separation between the at least two antenna modules, the orientation of each of the at least two antenna modules, or both. In some examples, the directional rank manager 1715 may determine the rank, of the second wireless device, associated with the beam direction, where the at least two uncorrelated signals are transmitted or received over the beam direction to or from the second wireless device based on the determined rank, of the second wireless device, associated with the beam direction.

In some examples, the directional rank manager 1715 may determine a distance between the first wireless device and a second wireless device. In some examples, the directional rank manager 1715 may determine a number of receive antenna elements associated with the second wireless device, where the rank associated with the beam direction is determined based on the distance between the first wireless device and the second wireless device, the number of receive antenna elements associated with the second wireless device, or both. In some examples, the directional rank manager 1715 may determine a carrier frequency associated with communications between the first wireless device and a second wireless device, where the rank associated with the beam direction is determined based on the determined carrier frequency. In some cases, the beam direction is associated with a LOS path or a NLOS path along a dominant cluster.

The uncorrelated signal manager 1720 may transmit at least two uncorrelated signals over the beam direction based on the rank associated with the beam direction. In some examples, the uncorrelated signal manager 1720 may transmit or receiving at least two uncorrelated signals over the beam direction based on the transmitted indication. In some examples, the uncorrelated signal manager 1720 may transmit a first signal to the second UE over the beam direction. In some examples, the uncorrelated signal manager 1720 may transmit a second signal to the third UE over the beam direction, where the first signal and the second signal are uncorrelated at the second UE and the third UE. In some examples, the uncorrelated signal manager 1720 may transmit an indication that the first signal corresponds to the second UE and that the second signal corresponds to the third UE.

The directional rank indication manager 1725 may transmit an indication of the beam direction and the rank associated with the beam direction. In some examples, transmitting, to a third wireless device, an indication of the beam direction and the rank associated with the beam direction, where the rank includes a capability of the first wireless device and the second wireless device to transmit or receive uncorrelated signals to or from the third wireless device over the beam direction. In some examples, the directional rank indication manager 1725 may receive an indication of the rank associated with the beam direction. In some examples, receiving an indication of the beam direction and the rank associated with the beam direction, where the rank includes a capability of a second wireless device and a third wireless device to receive uncorrelated signals from the first wireless device over the beam direction.

The antenna module manager 1730 may transmit an indication of an availability of the at least two antenna modules to transmit the at least two uncorrelated signals over the beam direction, receive at least two uncorrelated signals over the beam direction, or both. In some examples, the antenna module manager 1730 may determine an orientation of each of the at least two antenna modules, where the rank associated with the beam direction is determined based on the orientation of each of the at least two antenna modules. In some examples, the antenna module manager 1730 may transmit, to the second wireless device, signaling to coordinate antenna module usage of the first wireless device and the second wireless device. In some examples, the antenna module manager 1730 may receive an indication of an availability of two antenna modules of a second wireless device to transmit the at least two uncorrelated signals over the beam direction, receive at least two uncorrelated signals over the beam direction, or both, where the at least two uncorrelated signals are transmitted to or received from the second wireless device over the beam direction based on the received indication.

The positioning manager 1735 may receive positioning information from the second wireless device via a device-to-device wireless link, where the spatial separation between the first wireless device and the second wireless device is determined based on the received positioning information. In some examples, the positioning manager 1735 may transmit positioning information of the first wireless device to a third wireless device. In some examples, the positioning manager 1735 may receive positioning information of the second wireless device from the third wireless device, where the spatial separation between the first wireless device and the second wireless device is determined based on the received positioning information of the second wireless device.

The antenna array manager 1740 may select a first subset of antennas from an antenna array of the first wireless device based on the rank associated with the beam direction. In some examples, the antenna array manager 1740 may select a second subset of antennas from the antenna array of the first wireless device based on the rank associated with the beam direction, where the at least two uncorrelated signals are transmitted over the beam direction based on the selected first subset of antennas and the selected second subset of antennas. In some examples, the antenna array manager 1740 may transmit a first signal to a second wireless device based on the selected first subset of antennas. In some examples, the antenna array manager 1740 may transmit a second signal to a third wireless device based on the selected second subset of antennas. In some cases, the first subset of antennas are selected based on spatial separation distances between antenna elements of the first subset of antennas and a first distance between the first wireless device and the second wireless device, and where the second subset of antennas are selected based on spatial separation distances between antenna elements of the second subset of antennas and a second distance between the first wireless device and the third wireless device.

Figure 18:
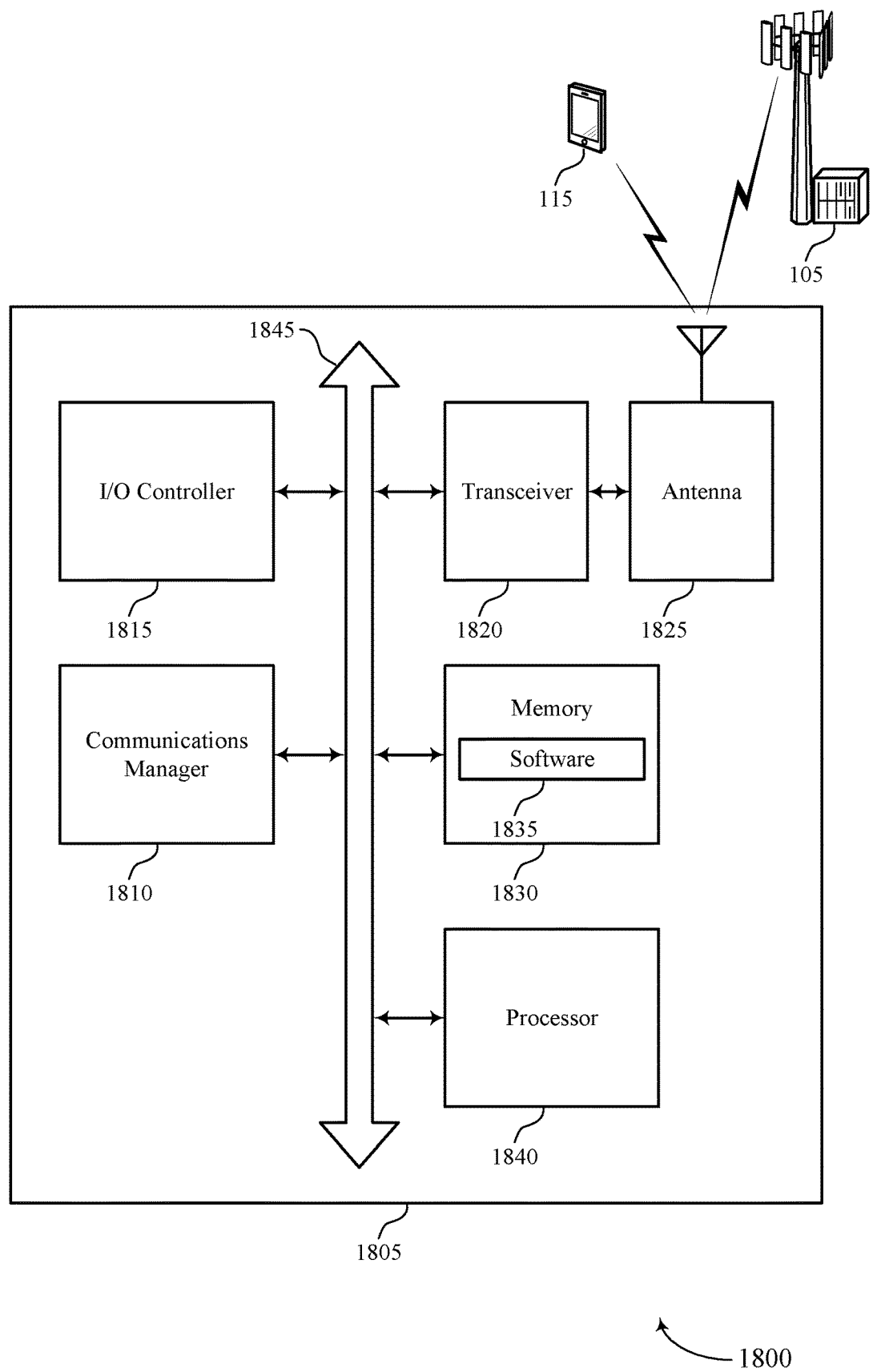
FIG. 18 shows a diagram of a system including a user equipment (UE) that supports higher rank MIMO enhancements in mmW and sub-THz bands in accordance with aspects of the present disclosure.

FIG. 18 shows a diagram of a system 1800 including a device 1805 that supports higher rank MIMO enhancements in upper mmW bands in accordance with aspects of the present disclosure. The device 1805 may be an example of or include the components of device 905, device 1005, device 1205, device 1305, device 1505, device 1605, or a UE 115 as described herein. The device 1805 may include components for bi-directional voice and data communications including components for transmitting and receiving communications, including a communications manager 1810, a transceiver 1820, an antenna 1825, memory 1830, a processor 1840, and an I/O controller 1815. These components may be in electronic communication via one or more buses (e.g., bus 1845).

The communications manager 1810 may (e.g., when the device 1805 is a transmitting device) determine a spatial separation distance between at least two transmitting entities or at least two receiving entities, determine a rank associated with a beam direction based on the spatial separation distance for the at least two transmitting entities or the at least two receiving entities, and transmit at least two uncorrelated signals over the beam direction based on the rank associated with the beam direction.

The communications manager 1810 may (e.g., when the device 1805 is a receiving device) receive an indication of a beam direction and a rank associated with the beam direction and receive at least two uncorrelated signals over the beam direction based on the rank associated with the beam direction.

The communications manager 1810 may (e.g., when the device 1805 is a receiving device) transmit an indication of a beam direction and a rank associated with the beam direction and receive at least one signal over the beam direction based on the rank associated with the beam direction.

Transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable software 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting higher rank MIMO enhancements in upper mmW bands).

The I/O controller 1815 may manage input and output signals for the device 1805. The I/O controller 1815 may also manage peripherals not integrated into the device 1805. In some cases, the I/O controller 1815 may represent a physical connection or port to an external peripheral. In some cases, the I/O controller 1815 may utilize an operating system such as iOS®, ANDROID®, MS-DOS®, MS-WINDOWS®, OS/2®, UNIX®, LINUX®, or another known operating system. In other cases, the I/O controller 1815 may represent or interact with a modem, a keyboard, a mouse, a touchscreen, or a similar device. In some cases, the I/O controller 1815 may be implemented as part of a processor. In some cases, a user may interact with the device 1805 via the I/O controller 1815 or via hardware components controlled by the I/O controller 1815.

The software 1835 may include instructions to implement aspects of the present disclosure, including instructions to support wireless communications. The software 1835 may be stored in a non-transitory computer-readable medium such as system memory or other type of memory. In some cases, the software 1835 may not be directly executable by the processor 1840 but may cause a computer (e.g., when compiled and executed) to perform functions described herein.

Figure 19:
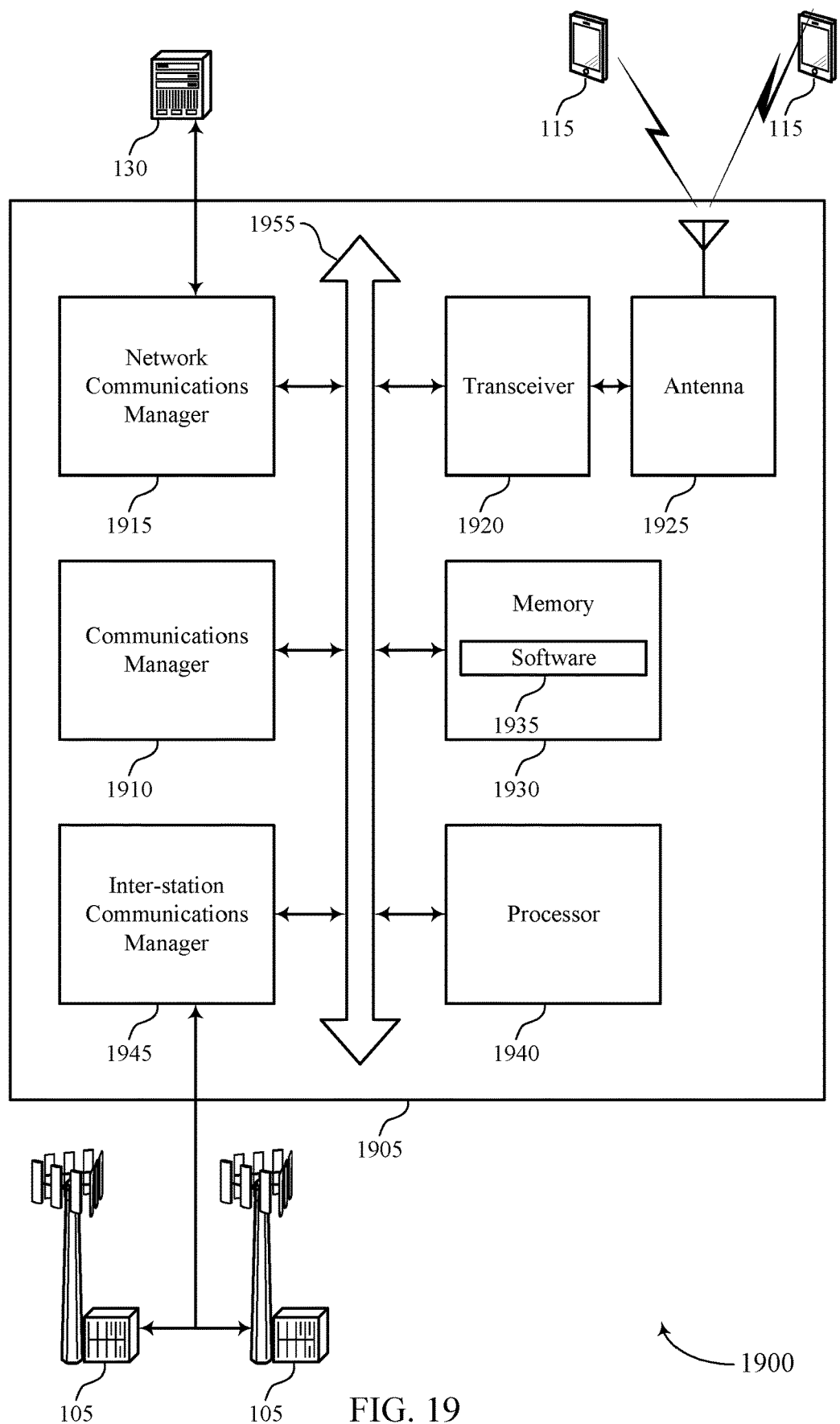
FIG. 19 shows a diagram of a system including a base station that supports higher rank MIMO enhancements in mmW and sub-THz bands in accordance with aspects of the present disclosure.

FIG. 19 shows a diagram of a system 1900 including a device 1905 that supports higher rank MIMO enhancements in upper mmW bands in accordance with aspects of the present disclosure. The device 1905 may be an example of or include the components of device 905, device 1005, device 1205, device 1305, device 1505, device 1605, or a base station 105 as described herein. The device 1905 may include components for bi-directional voice and data communications including components for transmitting and receiving communications, including a communications manager 1910, a network communications manager 1950, a transceiver 1920, an antenna 1925, memory 1930, a processor 1940, and an inter-station communications manager 1955. These components may be in electronic communication via one or more buses (e.g., bus 1945).

The communications manager 1910 may (e.g., when the device 1905 is a transmitting device) determine a spatial separation distance between at least two transmitting entities or at least two receiving entities, determine a rank associated with a beam direction based on the spatial separation distance for the at least two transmitting entities or the at least two receiving entities, and transmit at least two uncorrelated signals over the beam direction based on the rank associated with the beam direction.

The communications manager 1910 may (e.g., when the device 1905 is a receiving device) receive an indication of a beam direction and a rank associated with the beam direction and receive at least two uncorrelated signals over the beam direction based on the rank associated with the beam direction.

The communications manager 1910 may (e.g., when the device 1905 is a receiving device) transmit an indication of a beam direction and a rank associated with the beam direction and receive at least one signal over the beam direction based on the rank associated with the beam direction.

Network communications manager 1950 may manage communications with the core network (e.g., via one or more wired backhaul links). For example, the network communications manager 1950 may manage the transfer of data communications for client devices, such as one or more UEs 115.

Transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases, the device may have more than one antenna 1925, which may be capable of concurrently transmitting or receiving multiple wireless transmissions.

The memory 1930 may include RAM, ROM, or a combination thereof. The memory 1930 may store computer-readable software 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting higher rank MIMO enhancements in upper mmW bands).

Inter-station communications manager 1955 may manage communications with other base station 105, and may include a controller or scheduler for controlling communications with UEs 115 in cooperation with other base stations 105. For example, the inter-station communications manager 1955 may coordinate scheduling for transmissions to UEs 115 for various interference mitigation techniques such as beamforming or joint transmission. In some examples, inter-station communications manager 1955 may provide an X2 interface within an LTE/LTE-A wireless communication network technology to provide communication between base stations 105.

The software 1935 may include instructions to implement aspects of the present disclosure, including instructions to support wireless communications. The software 1935 may be stored in a non-transitory computer-readable medium such as system memory or other type of memory. In some cases, the software 1935 may not be directly executable by the processor 1940 but may cause a computer (e.g., when compiled and executed) to perform functions described herein.

Figure 20:
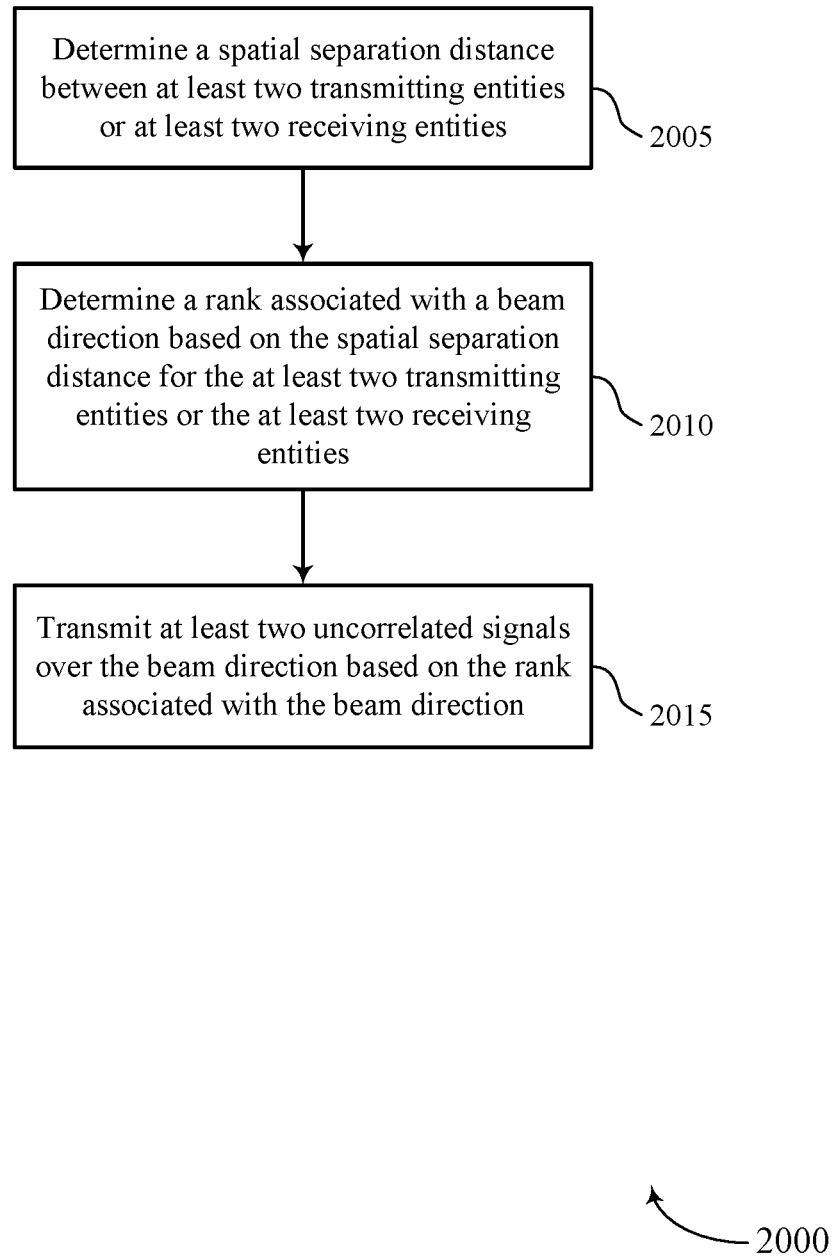
FIGS. 20 through 25 show flowcharts illustrating methods that support higher rank MIMO enhancements in mmW and sub-THz bands in accordance with aspects of the present disclosure.

FIG. 20 shows a flowchart illustrating a method 2000 that supports higher rank MIMO enhancements in upper mmW bands in accordance with aspects of the present disclosure. The operations of method 2000 may be implemented by a UE 115 (or its components as described herein) or base station 105 (or its components as described herein). For example, the operations of method 2000 may be performed by a communications manager as described with reference to FIGS. 9 through 19. In some examples, a UE or base station may execute a set of instructions to control the functional elements of the UE or base station to perform the functions described below. Additionally or alternatively, a UE or base station may perform aspects of the functions described below using special-purpose hardware.

At 2005, the UE or base station may determine a spatial separation distance between at least two transmitting entities or at least two receiving entities. The operations of 2005 may be performed according to the methods described herein. In some examples, aspects of the operations of 2005 may be performed by a spatial separation manager as described with reference to FIGS. 9 through 19.

At 2010, the UE or base station may determine a rank associated with a beam direction based on the spatial separation distance for the at least two transmitting entities or the at least two receiving entities. The operations of 2010 may be performed according to the methods described herein. In some examples, aspects of the operations of 2010 may be performed by a directional rank manager as described with reference to FIGS. 9 through 19.

At 2015, the UE or base station may transmit at least two uncorrelated signals over the beam direction based on the rank associated with the beam direction. The operations of 2015 may be performed according to the methods described herein. In some examples, aspects of the operations of 2015 may be performed by an uncorrelated signal manager as described with reference to FIGS. 9 through 19.

Figure 21:
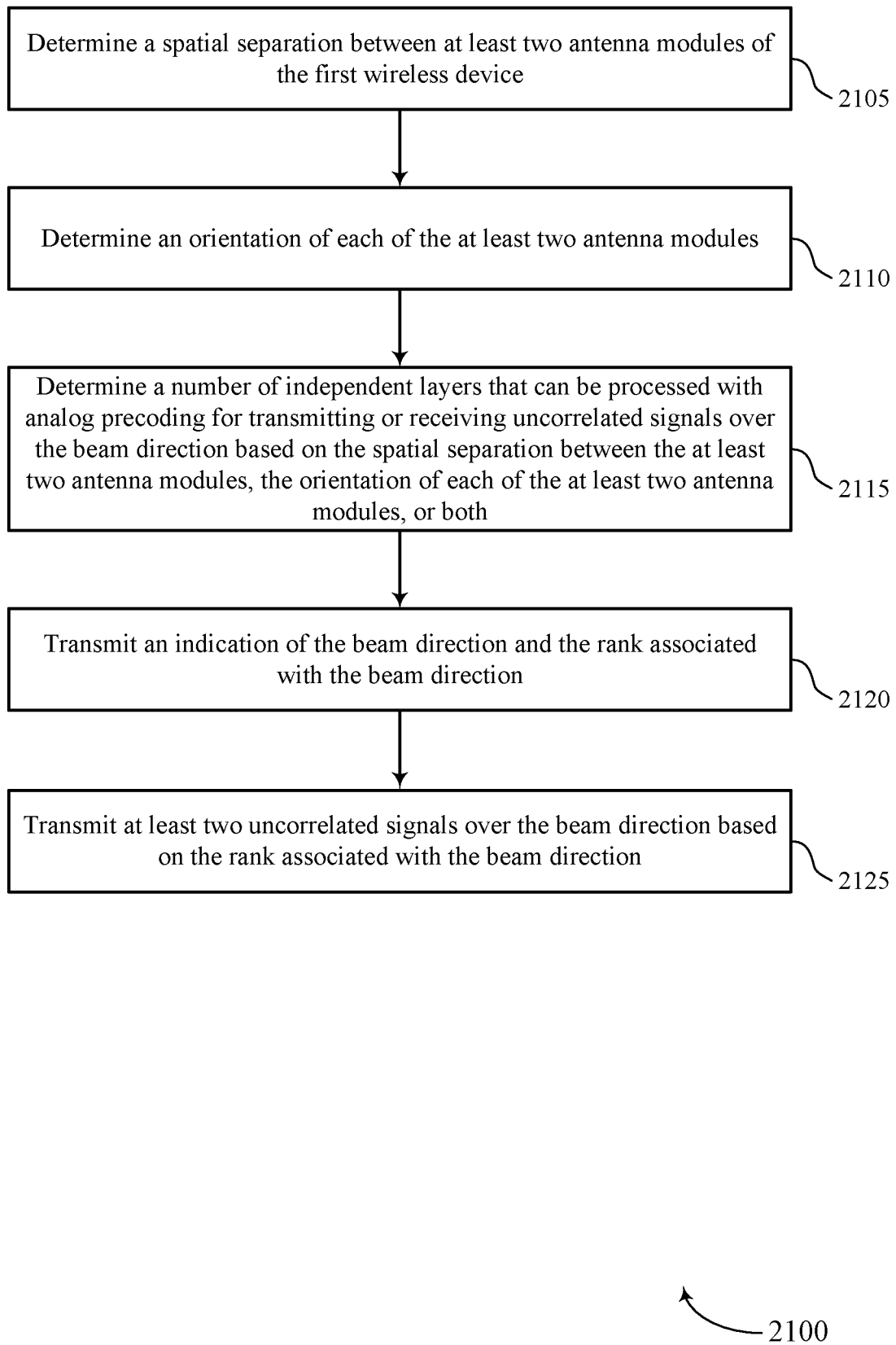

FIG. 21 shows a flowchart illustrating a method 2100 that supports higher rank MIMO enhancements in upper mmW bands in accordance with aspects of the present disclosure. The operations of method 2100 may be implemented by a UE 115 or its components as described herein. For example, the operations of method 2100 may be performed by a communications manager as described with reference to FIGS. 9 through 19. In some examples, a UE may execute a set of instructions to control the functional elements of the UE to perform the functions described below. Additionally or alternatively, a UE may perform aspects of the functions described below using special-purpose hardware.

At 2105, the UE may determine a spatial separation between at least two antenna modules of the UE. The operations of 2105 may be performed according to the methods described herein. In some examples, aspects of the operations of 2105 may be performed by a spatial separation manager as described with reference to FIGS. 9 through 19.

At 2110, the UE may determine an orientation of each of the at least two antenna modules. The operations of 2110 may be performed according to the methods described herein. In some examples, aspects of the operations of 2110 may be performed by an antenna module manager as described with reference to FIGS. 9 through 19.

At 2115, the UE may determine a number of independent layers that can be processed with analog precoding for transmitting or receiving uncorrelated signals over the beam direction based on the spatial separation between the at least two antenna modules, the orientation of each of the at least two antenna modules, or both. The operations of 2115 may be performed according to the methods described herein. In some examples, aspects of the operations of 2115 may be performed by a directional rank manager as described with reference to FIGS. 9 through 19.

At 2120, the UE may transmit an indication of the beam direction and the rank associated with the beam direction. The operations of 2120 may be performed according to the methods described herein. In some examples, aspects of the operations of 2120 may be performed by a directional rank indication manager as described with reference to FIGS. 9 through 19.

At 2125, the UE may transmit at least two uncorrelated signals over the beam direction based on the rank associated with the beam direction. The operations of 2125 may be performed according to the methods described herein. In some examples, aspects of the operations of 2125 may be performed by an uncorrelated signal manager as described with reference to FIGS. 9 through 19.

Figure 22:
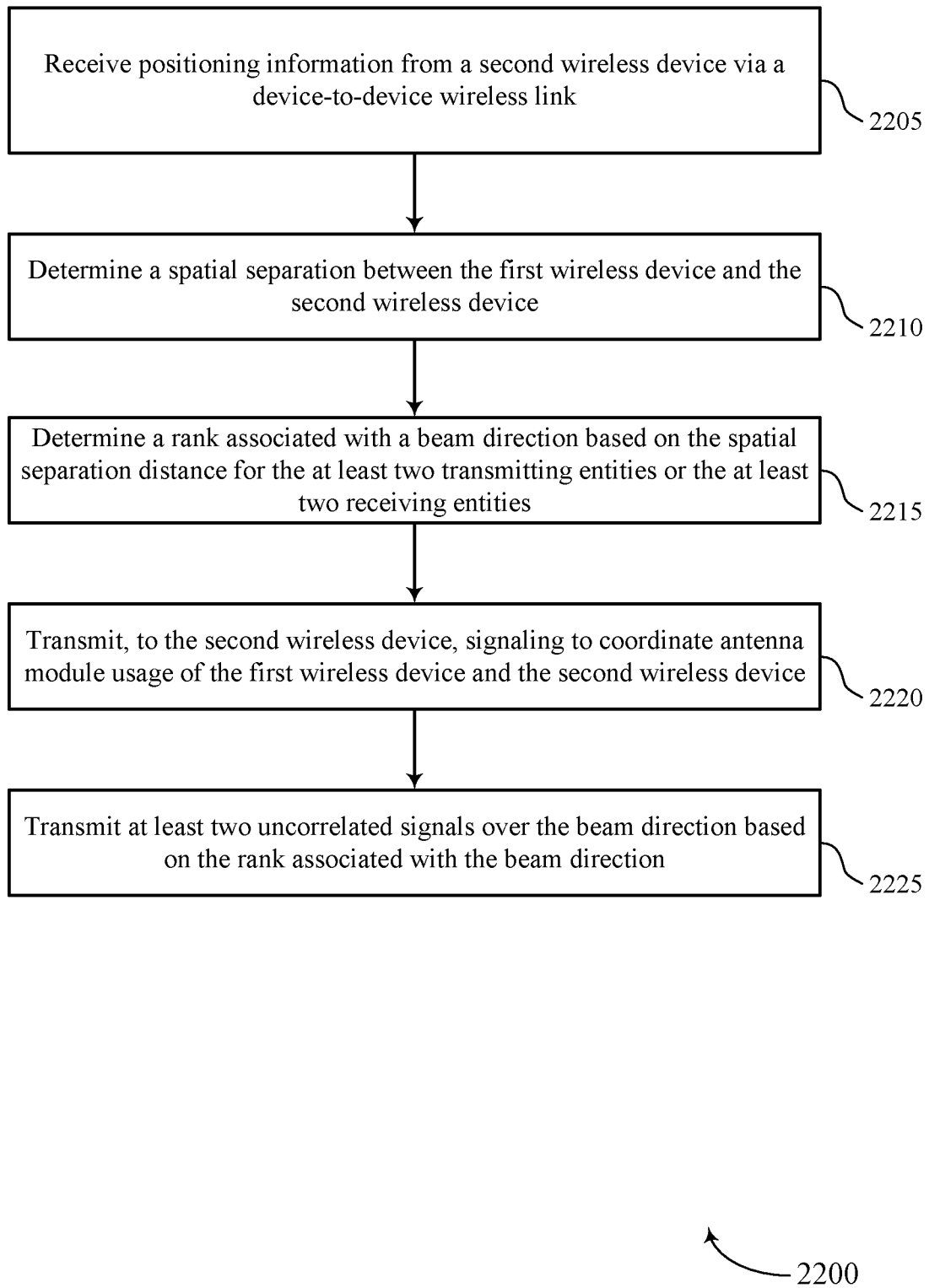

FIG. 22 shows a flowchart illustrating a method 2200 that supports higher rank MIMO enhancements in upper mmW bands in accordance with aspects of the present disclosure. The operations of method 2200 may be implemented by a UE 115 or its components as described herein. For example, the operations of method 2200 may be performed by a communications manager as described with reference to FIGS. 9 through 19. In some examples, a UE may execute a set of instructions to control the functional elements of the UE to perform the functions described below. Additionally or alternatively, a UE may perform aspects of the functions described below using special-purpose hardware.

At 2205, the UE may receive positioning information from a second wireless device (e.g., a neighbor UE or another UE) via a device-to-device wireless link. The operations of 2205 may be performed according to the methods described herein. In some examples, aspects of the operations of 2205 may be performed by a positioning manager as described with reference to FIGS. 9 through 19.

At 2210, the UE may determine a spatial separation between the UE and the second wireless device (e.g., based on the received positioning information). The operations of 2210 may be performed according to the methods described herein. In some examples, aspects of the operations of 2210 may be performed by a spatial separation manager as described with reference to FIGS. 9 through 19.

At 2215, the UE may determine a rank associated with a beam direction based on the spatial separation distance between the UE and the second wireless device. The operations of 2215 may be performed according to the methods described herein. In some examples, aspects of the operations of 2215 may be performed by a directional rank manager as described with reference to FIGS. 9 through 19.

At 2220, the UE may transmit, to the second wireless device, signaling to coordinate antenna module usage of the UE and the second wireless device. The operations of 2220 may be performed according to the methods described herein. In some examples, aspects of the operations of 2220 may be performed by an antenna module manager as described with reference to FIGS. 9 through 19.

At 2225, the UE may transmit at least two uncorrelated signals over the beam direction based on the rank associated with the beam direction. For example, the UE and the second wireless device may, based on the coordination at 2220, combined transmit at least two uncorrelated signals over the beam direction (e.g., the UE and the second wireless device may each transmit a signal simultaneously, where the two signal may appear uncorrelated at a base station). The operations of 2225 may be performed according to the methods described herein. In some examples, aspects of the operations of 2225 may be performed by an uncorrelated signal manager as described with reference to FIGS. 9 through 19.

Figure 23:
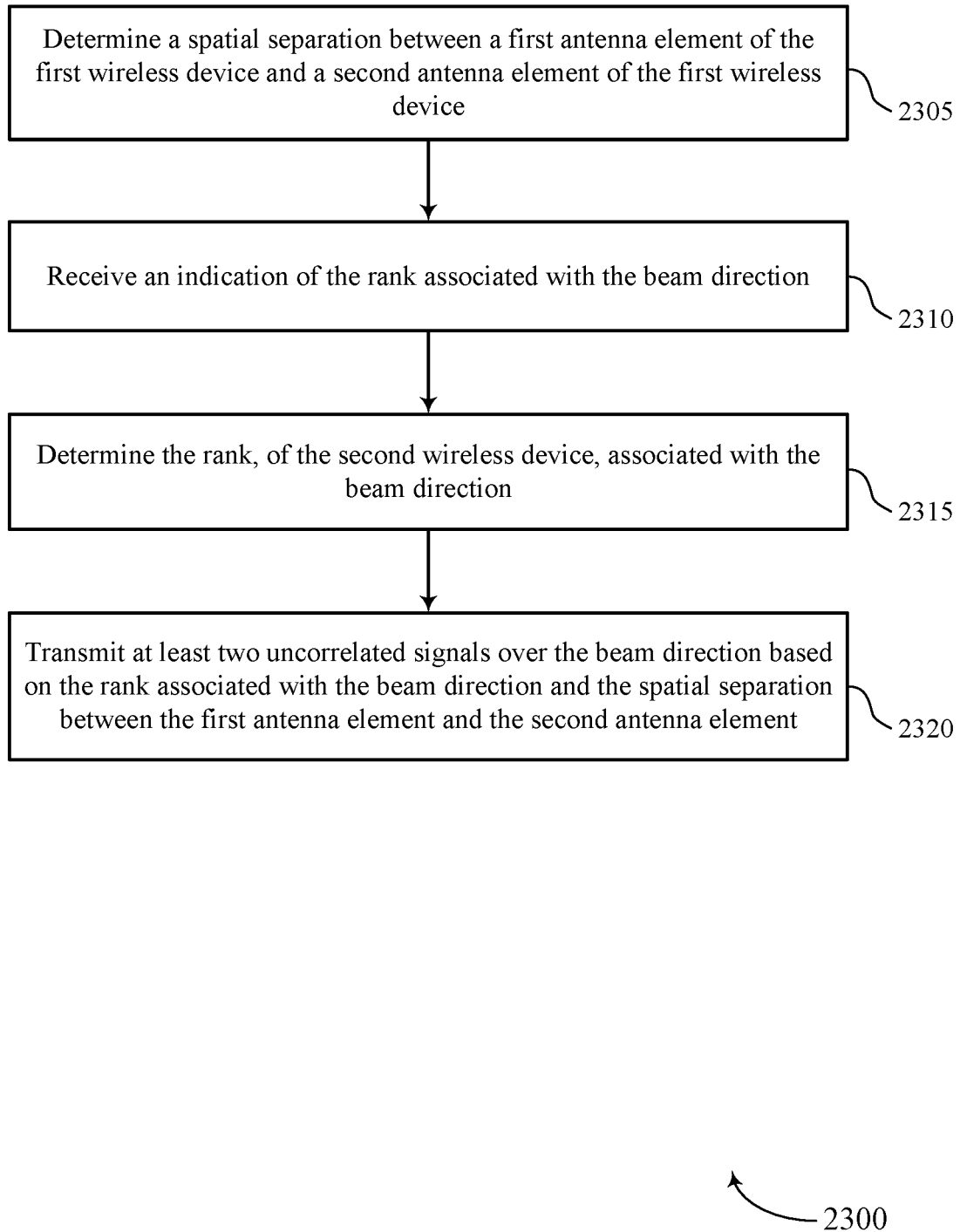

FIG. 23 shows a flowchart illustrating a method 2300 that supports higher rank MIMO enhancements in upper mmW bands in accordance with aspects of the present disclosure. The operations of method 2300 may be implemented by a base station 105 or its components as described herein. For example, the operations of method 2300 may be performed by a communications manager as described with reference to FIGS. 9 through 19. In some examples, a base station may execute a set of instructions to control the functional elements of the base station to perform the functions described below. Additionally or alternatively, a base station may perform aspects of the functions described below using special-purpose hardware.

At 2305, the base station may determine a spatial separation between a first antenna element of the base station and a second antenna element of the base station. The operations of 2305 may be performed according to the methods described herein. In some examples, aspects of the operations of 2305 may be performed by a spatial separation manager as described with reference to FIGS. 9 through 19.

At 2310, the base station may receive an indication of the rank associated with the beam direction (e.g., from a second device). The operations of 2310 may be performed according to the methods described herein. In some examples, aspects of the operations of 2310 may be performed by a directional rank indication manager as described with reference to FIGS. 9 through 19.

At 2315, the base station may determine the rank, of the second wireless device, associated with the beam direction. The operations of 2315 may be performed according to the methods described herein. In some examples, aspects of the operations of 2315 may be performed by a directional rank manager as described with reference to FIGS. 9 through 19.

At 2320, the base station may transmit at least two uncorrelated signals over the beam direction based on the rank associated with the beam direction and the spatial separation between the first antenna element and the second antenna element. The operations of 2320 may be performed according to the methods described herein. In some examples, aspects of the operations of 2320 may be performed by an uncorrelated signal manager as described with reference to FIGS. 9 through 19.

Figure 24:
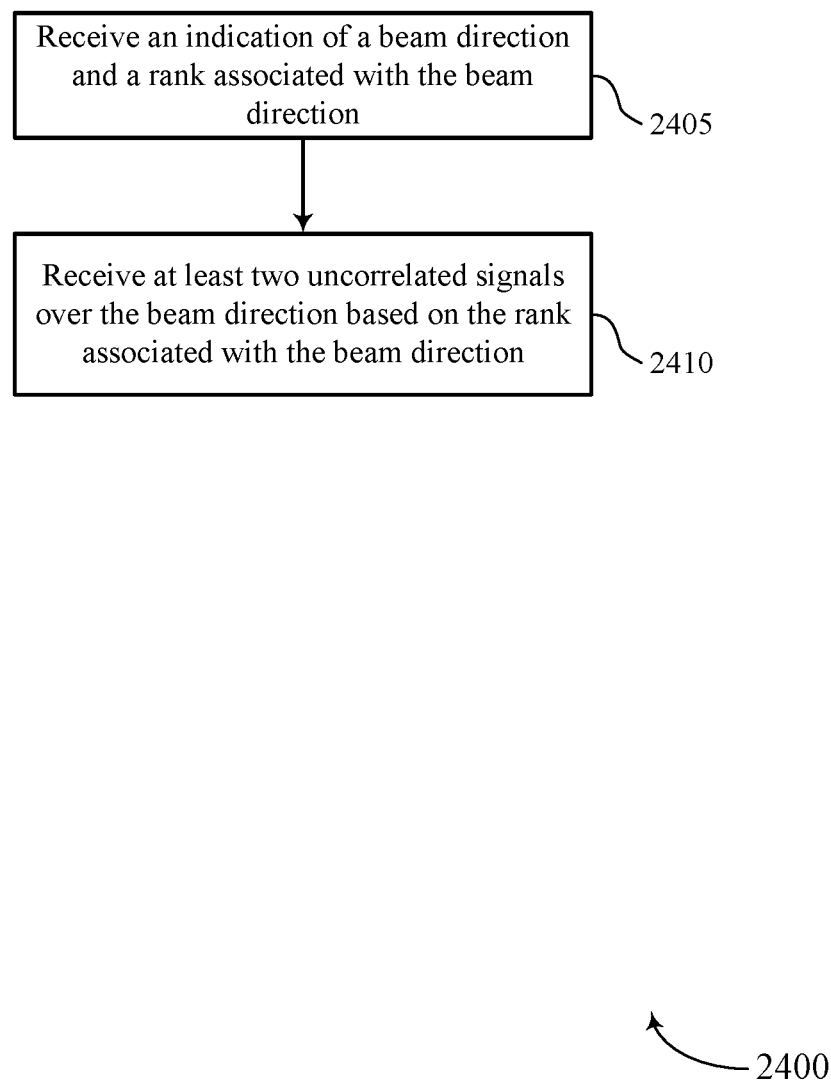

FIG. 24 shows a flowchart illustrating a method 2400 that supports higher rank MIMO enhancements in upper mmW bands in accordance with aspects of the present disclosure. The operations of method 2400 may be implemented by a UE 115 (or its components as described herein) or base station 105 (or its components as described herein). For example, the operations of method 2400 may be performed by a communications manager as described with reference to FIGS. 9 through 19. In some examples, a UE or base station may execute a set of instructions to control the functional elements of the UE or base station to perform the functions described below. Additionally or alternatively, a UE or base station may perform aspects of the functions described below using special-purpose hardware.

At 2405, the UE or base station may receive an indication of a beam direction and a rank associated with the beam direction. The operations of 2405 may be performed according to the methods described herein. In some examples, aspects of the operations of 2405 may be performed by a directional rank manager as described with reference to FIGS. 9 through 19.

At 2410, the UE or base station may receive at least two uncorrelated signals over the beam direction based on the rank associated with the beam direction. The operations of 2410 may be performed according to the methods described herein. In some examples, aspects of the operations of 2410 may be performed by an uncorrelated signal manager as described with reference to FIGS. 9 through 19.

Figure 25:
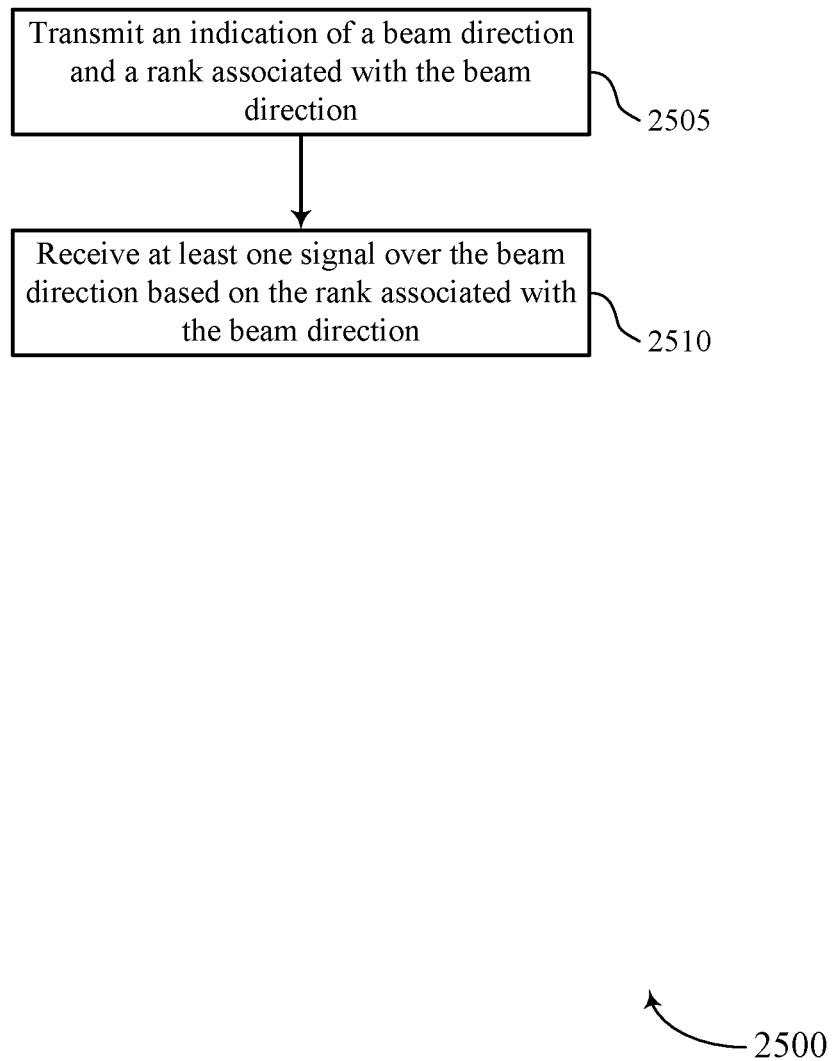

FIG. 25 shows a flowchart illustrating a method 2500 that supports higher rank MIMO enhancements in upper mmW bands in accordance with aspects of the present disclosure. The operations of method 2500 may be implemented by a UE 115 (or its components as described herein) or base station 105 (or its components as described herein). For example, the operations of method 2500 may be performed by a communications manager as described with reference to FIGS. 9 through 19. In some examples, a UE or base station may execute a set of instructions to control the functional elements of the UE or base station to perform the functions described below. Additionally or alternatively, a UE or base station may perform aspects of the functions described below using special-purpose hardware.

At 2505, the UE or base station may transmit an indication of a beam direction and a rank associated with the beam direction. The operations of 2505 may be performed according to the methods described herein. In some examples, aspects of the operations of 2505 may be performed by a directional rank manager as described with reference to FIGS. 9 through 19.

At 2510, the UE or base station may receive at least one signal over the beam direction based on the rank associated with the beam direction. The operations of 2510 may be performed according to the methods described herein. In some examples, aspects of the operations of 2510 may be performed by an uncorrelated signal manager as described with reference to FIGS. 9 through 19.

It should be noted that the methods described herein describe possible implementations, and that the operations and the steps may be rearranged or otherwise modified and that other implementations are possible. Further, aspects from two or more of the methods may be combined.

Aspect 1 is a method of wireless communication at a first wireless device that includes determining a spatial separation distance between at least two transmitting entities or at least two receiving entities, determining a rank associated with a beam direction based on the spatial separation distance for the at least two transmitting entities or the at least two receiving entities, and transmitting at least two uncorrelated signals over the beam direction based on the rank associated with the beam direction.

In Aspect 2, the method of aspect 1 includes transmitting an indication of the beam direction and the rank associated with the beam direction. In Aspect 3, the method of any of aspects 1-2 further includes transmitting or receiving at least two uncorrelated signals over the beam direction based on the transmitted indication. In Aspect 4, the determining the spatial separation distance between the at least two transmitting entities or the at least two receiving entities of aspect 1 may include determining a spatial separation between at least two antenna modules of the first wireless device.

In Aspect 5, the method of any of aspects 1-4 further includes transmitting an indication of an availability of the at least two antenna modules to transmit the at least two uncorrelated signals over the beam direction, receiving at least two uncorrelated signals over the beam direction, or both. In Aspect 6, the method of any of aspects 1-5 further includes determining an orientation of each of the at least two antenna modules, where the rank associated with the beam direction may be determined based on the orientation of each of the at least two antenna modules. In Aspect 7, the method of any of aspects 1-6 further includes determining a number of independent layers that can be processed with analog precoding for transmitting or receiving uncorrelated signals over the beam direction based on the spatial separation between the at least two antenna modules, the orientation of each of the at least two antenna modules, or both.

In Aspect 8, the method of any of aspects 1-7 further includes determining a spatial separation between the first wireless device and a second wireless device. In Aspect 9, the method of any of aspects 1-8 further includes transmitting, to a third wireless device, an indication of the beam direction and the rank associated with the beam direction, where the rank includes a capability of the first wireless device and the second wireless device to transmit or receive uncorrelated signals to or from the third wireless device over the beam direction. In Aspect 10, the method of any of aspects 1-9 includes receiving positioning information from the second wireless device via a device-to-device wireless link, where the spatial separation between the first wireless device and the second wireless device may be determined based on the received positioning information. In Aspect 11, the method of any of aspects 1-10 includes transmitting, to the second wireless device, signaling to coordinate antenna module usage of the first wireless device and the second wireless device. In Aspect 12, the method of any of aspects 1-11 includes receiving positioning information of the second wireless device from the third wireless device, where the spatial separation between the first wireless device and the second wireless device may be determined based on the received positioning information of the second wireless device.

In Aspect 13, the method of any of aspects 1-12 further includes determining a spatial separation between a first antenna element of the first wireless device and a second antenna element of the first wireless device. In Aspect 14, the method of any of aspects 1-13 further includes receiving an indication of the rank associated with the beam direction. In Aspect 14, the method of any of aspects 1-13 further includes determining the rank, of the second wireless device, associated with the beam direction, where the at least two uncorrelated signals may be transmitted or received over the beam direction to or from the second wireless device based on the determined rank, of the second wireless device, associated with the beam direction.

In Aspect 15, the method of any of aspects 1-14 further includes receiving an indication of an availability of two antenna modules of a second wireless device to transmit the at least two uncorrelated signals over the beam direction, receiving at least two uncorrelated signals over the beam direction, or both, where the at least two uncorrelated signals may be transmitted to or received from the second wireless device over the beam direction based on the received indication. In Aspect 16, the method of any of aspects 1-15 further includes receiving an indication of the beam direction and the rank associated with the beam direction, where the rank includes a capability of a second wireless device and a third wireless device to receive uncorrelated signals from the first wireless device over the beam direction.

In Aspect 17, the method of any of aspects 1-16 further includes transmitting a first signal to the second UE over the beam direction, and transmitting a second signal to the third UE over the beam direction, where the first signal and the second signal may be uncorrelated at the second UE and the third UE. In Aspect 18, the method of any of aspects 1-17 further includes transmitting an indication that the first signal corresponds to the second UE and that the second signal corresponds to the third UE.

In Aspect 19, the method of any of aspects 1-18 further includes selecting a first subset of antennas from an antenna array of the first wireless device based on the rank associated with the beam direction, and selecting a second subset of antennas from the antenna array of the first wireless device based on the rank associated with the beam direction, where the at least two uncorrelated signals may be transmitted over the beam direction based on the selected first subset of antennas and the selected second subset of antennas. In Aspect 20, the method of aspect 19 further includes transmitting a first signal to a second wireless device based on the selected first subset of antennas, and transmitting a second signal to a third wireless device based on the selected second subset of antennas. In Aspect 21, in the method of aspect 19 the first subset of antennas may be selected based on spatial separation distances between antenna elements of the first subset of antennas and a first distance between the first wireless device and the second wireless device, and where the second subset of antennas may be selected based on spatial separation distances between antenna elements of the second subset of antennas and a second distance between the first wireless device and the third wireless device.

In Aspect 22, the method of any of aspects 1-21 further includes determining a number of receive antenna elements associated with the second wireless device, where the rank associated with the beam direction may be determined based on the distance between the first wireless device and the second wireless device, the number of receive antenna elements associated with the second wireless device, or both. In Aspect 23, the method of any of aspect 1-22 further includes determining a carrier frequency associated with communications between the first wireless device and a second wireless device, where the rank associated with the beam direction may be determined based on the determined carrier frequency. In Aspect 24, in the method of any of aspect 1-23 the beam direction may be associated with a LOS path or a NLOS path along a dominant cluster.

Aspect 25 is a system or apparatus including means for implementing a method or realizing an apparatus as any of aspect 1-24. Aspect 26 is a non-transitory computer-readable medium storing instructions executable by one or more processors to cause the one or more processors to implement a method as in any of aspects 1-24. Aspect 27 is a system including one or more processors and memory in electronic communication with the one or more processors storing instructions executable by the one or more processors to cause the system or apparatus to implement a method as in any of aspects 1-24.

Aspect 28 is a method of wireless communication at a first wireless device that includes receiving an indication of a beam direction and a rank associated with the beam direction and receiving at least two uncorrelated signals over the beam direction based on the rank associated with the beam direction. In Aspect 29, the method of aspect 28 further includes receiving a first signal over the beam direction from a second wireless device, and receiving a second signal over the beam direction from a third wireless device, where the first signal and the second signal may be uncorrelated at the first wireless device. In Aspect 30, in the method of any of aspects 28-29 the at least two uncorrelated signals over the beam direction may be received from a second wireless device.

In Aspect 31, the method of any of aspects 28-30 further includes receiving a first positioning signal from a second wireless device, receiving a second positioning signal from a third wireless device, determining a distance between the second wireless device and the third wireless device based on the received first positioning signal and the received second positioning signal, and transmitting an indication of the distance to the second wireless device and the third wireless device, where the indication of the beam direction and the rank associated with the beam direction may be received based on the transmitted indication of the distance. In Aspect 32, the method of any of aspects 28-31 further includes receiving an indication of antenna module availability of a second wireless device to transmit the at least two uncorrelated signals over the beam direction, where the at least two uncorrelated signals may be received based on the received indication of the antenna module availability of the second wireless device.

In Aspect 33, in the method of any of aspects 28-32 the indication of the beam direction and the rank associated with the beam direction includes a capability of a second wireless device and a third wireless device to transmit uncorrelated signals to the first wireless device over the beam direction. In Aspect 33, the method of any of aspects 28-32 further includes transmitting positioning information of the third wireless device to the second wireless device, where the indication of the beam direction and the rank associated with the beam direction may be received from the second wireless device based on the transmitted positioning information.

Aspect 34 is a system or apparatus including means for implementing a method or realizing an apparatus as any of aspect 28-32. Aspect 35 is a non-transitory computer-readable medium storing instructions executable by one or more processors to cause the one or more processors to implement a method as in any of aspects 28-32. Aspect 36 is a system including one or more processors and memory in electronic communication with the one or more processors storing instructions executable by the one or more processors to cause the system or apparatus to implement a method as in any of aspects 28-32.

Aspect 37 is a method of wireless communication at a first wireless device that includes transmitting an indication of a beam direction and a rank associated with the beam direction and receiving at least one signal over the beam direction based on the rank associated with the beam direction. In Aspect 38, the method of aspect 37 further includes receiving at least two uncorrelated signals over the beam direction based on the transmitted indication. In Aspect 39, the method of any of aspects 37-38 further includes receiving a first signal over the beam direction based on the transmitted indication.

In Aspect 40, the method of any of aspects 37-39 further includes receiving an indication that the first signal corresponds to the first wireless device and that a second signal corresponds to a second wireless device, where the first signal and the second signal include two uncorrelated signals over the beam direction. In Aspect 41, the method of any of aspects 37-40 further includes determining a distance between the first wireless device and a second wireless device, where the indication may be transmitted based on the distance. In Aspect 42, the method of any of aspects 37-41 further includes determining a number of antenna modules at the first wireless device, where the indication may be transmitted based on the number of antenna modules.

In Aspect 43, in the method of any of aspects 37-42 the indication includes an indication of the number of antenna modules. In Aspect 44, in the method of any of aspects 37-43 the rank associated with the beam direction may be based on a number of receive antennas associated with the first device. In Aspect 45, the method of any of aspects 37-44 further includes determining a spatial separation between the first wireless device and a second wireless device, where the indication may be transmitted to a third wireless device based on the determined spatial separation between the first wireless device and the second wireless device. In Aspect 46, the method of any of aspects 37-45 further includes transmitting positioning information of the first wireless device to the second wireless device, and receiving positioning information of the second wireless device from the second wireless device, where the spatial separation between the first wireless device and the second wireless device may be determined based on the received positioning information of the second wireless device.

Aspect 47 is a system or apparatus including means for implementing a method or realizing an apparatus as any of aspect 37-46. Aspect 48 is a non-transitory computer-readable medium storing instructions executable by one or more processors to cause the one or more processors to implement a method as in any of aspects 37-46. Aspect 49 is a system including one or more processors and memory in electronic communication with the one or more processors storing instructions executable by the one or more processors to cause the system or apparatus to implement a method as in any of aspects 37-46.

It should be noted that Aspects 1 through 49 (or aspects of the Aspects 1 through 49) may be combined with any aspects or aspects discussed elsewhere in the present application.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
   determining a spatial separation distance between at least two transmitting entities or at least two receiving entities;
   determining a rank associated with a beam direction based at least in part on the spatial separation distance for the at least two transmitting entities or the at least two receiving entities; and
   transmitting at least two uncorrelated signals over the beam direction based at least in part on the rank associated with the beam direction.

2. The method of claim 1, further comprising:
   transmitting an indication of the beam direction and the rank associated with the beam direction.

3. The method of claim 2, further comprising:
   transmitting or receiving at least two uncorrelated signals over the beam direction based at least in part on the transmitted indication.

4. The method of claim 1, wherein determining the spatial separation distance between the at least two transmitting entities or the at least two receiving entities comprises:
   determining a spatial separation between at least two antenna modules of the first wireless device.

5. The method of claim 4, further comprising:
   transmitting an indication of an availability of the at least two antenna modules to transmit the at least two uncorrelated signals over the beam direction, receiving at least two uncorrelated signals over the beam direction, or both.

6. The method of claim 4, further comprising:
   determining an orientation of each of the at least two antenna modules, wherein the rank associated with the beam direction is determined based at least in part on the orientation of each of the at least two antenna modules.

7. The method of claim 6, wherein determining the rank associated with the beam direction comprises:
   determining a number of independent layers that can be processed with analog precoding for transmitting or receiving uncorrelated signals over the beam direction based at least in part on the spatial separation between the at least two antenna modules, the orientation of each of the at least two antenna modules, or both.

8. The method of claim 1, wherein determining the spatial separation distance between the at least two transmitting entities or the at least two receiving entities comprises:
   determining a spatial separation between the first wireless device and a second wireless device.

9. The method of claim 8, further comprising:
   transmitting, to a third wireless device, an indication of the beam direction and the rank associated with the beam direction, wherein the rank comprises a capability of the first wireless device and the second wireless device to transmit or receive uncorrelated signals to or from the third wireless device over the beam direction.

10. The method of claim 8, further comprising:
    receiving positioning information from the second wireless device via a device-to-device wireless link, wherein the spatial separation between the first wireless device and the second wireless device is determined based at least in part on the received positioning information.

11. The method of claim 10, further comprising:
    transmitting, to the second wireless device, signaling to coordinate antenna module usage of the first wireless device and the second wireless device.

12. The method of claim 8, further comprising:
    transmitting positioning information of the first wireless device to a third wireless device; and
    receiving positioning information of the second wireless device from the third wireless device, wherein the spatial separation between the first wireless device and the second wireless device is determined based at least in part on the received positioning information of the second wireless device.

13. The method of claim 1, wherein determining the spatial separation distance between the at least two transmitting entities or the at least two receiving entities comprises:
    determining a spatial separation between a first antenna element of the first wireless device and a second antenna element of the first wireless device.

14. The method of claim 1, further comprising:
    receiving an indication of the rank associated with the beam direction.

15. The method of claim 14, wherein determining the rank associated with the beam direction comprises:
    determining the rank, of a second wireless device, associated with the beam direction, wherein the at least two uncorrelated signals are transmitted or received over the beam direction to or from the second wireless device based at least in part on the determined rank, of the second wireless device, associated with the beam direction.

16. The method of claim 1, further comprising:
    receiving an indication of an availability of two antenna modules of a second wireless device to transmit the at least two uncorrelated signals over the beam direction, receiving the at least two uncorrelated signals over the beam direction, or both, wherein the at least two uncorrelated signals are transmitted to or received from the second wireless device over the beam direction based at least in part on the received indication.

17. The method of claim 1, further comprising:
    receiving an indication of the beam direction and the rank associated with the beam direction, wherein the rank comprises a capability of a second wireless device and a third wireless device to receive uncorrelated signals from the first wireless device over the beam direction.

18. The method of claim 17, wherein transmitting the at least two uncorrelated signals over the beam direction comprises:
    transmitting a first signal to the second wireless device over the beam direction; and
    transmitting a second signal to the third wireless device over the beam direction, wherein the first signal and the second signal are uncorrelated at the second wireless device and the third wireless device.

19. The method of claim 18, further comprising:
transmitting an indication that the first signal corresponds to the second wireless device and that the second signal corresponds to the third wireless device.

20. The method of claim 1, further comprising:
selecting a first subset of antennas from an antenna array of the first wireless device based at least in part on the rank associated with the beam direction; and
selecting a second subset of antennas from the antenna array of the first wireless device based at least in part on the rank associated with the beam direction, wherein the at least two uncorrelated signals are transmitted over the beam direction based at least in part on the selected first subset of antennas and the selected second subset of antennas.

21. The method of claim 20, wherein transmitting the at least two uncorrelated signals over the beam direction comprises:
transmitting a first signal to a second wireless device based at least in part on the selected first subset of antennas; and
transmitting a second signal to a third wireless device based at least in part on the selected second subset of antennas.

22. The method of claim 21, wherein the first subset of antennas are selected based at least in part on spatial separation distances between antenna elements of the first subset of antennas and a first distance between the first wireless device and the second wireless device, and wherein the second subset of antennas are selected based at least in part on spatial separation distances between antenna elements of the second subset of antennas and a second distance between the first wireless device and the third wireless device.

23. The method of claim 1, further comprising:
determining a distance between the first wireless device and a second wireless device; and
determining a number of receive antenna elements associated with the second wireless device, wherein the rank associated with the beam direction is determined based at least in part on the distance between the first wireless device and the second wireless device, the number of receive antenna elements associated with the second wireless device, or both.

24. The method of claim 1, further comprising:
determining a carrier frequency associated with communications between the first wireless device and a second wireless device, wherein the rank associated with the beam direction is determined based at least in part on the determined carrier frequency.

25. The method of claim 1, wherein the beam direction is associated with a line of sight path or a non-line of sight path along a dominant cluster.

26. A method for wireless communication at a first wireless device, comprising:
receiving an indication of a beam direction and a rank associated with the beam direction; and
receiving at least two uncorrelated signals over the beam direction based at least in part on the rank associated with the beam direction.

27. The method of claim 26, further comprising:
receiving a first positioning signal from a second wireless device;
receiving a second positioning signal from a third wireless device;
determining a distance between the second wireless device and the third wireless device based at least in part on the received first positioning signal and the received second positioning signal; and
transmitting an indication of the distance to the second wireless device and the third wireless device, wherein the indication of the beam direction and the rank associated with the beam direction is received based at least in part on the transmitted indication of the distance.

28. The method of claim 26, further comprising:
receiving an indication of antenna module availability of a second wireless device to transmit the at least two uncorrelated signals over the beam direction, wherein the at least two uncorrelated signals are received based at least in part on the received indication of the antenna module availability of the second wireless device.

29. A method for wireless communication at a first wireless device, comprising:
transmitting an indication of a beam direction and a rank associated with the beam direction; and
receiving at least one signal over the beam direction based at least in part on the rank associated with the beam direction.

30. The method of claim 29, further comprising:
determining a distance between the first wireless device and a second wireless device, wherein the indication is transmitted based at least in part on the distance.

* * * * *